Figure 1:
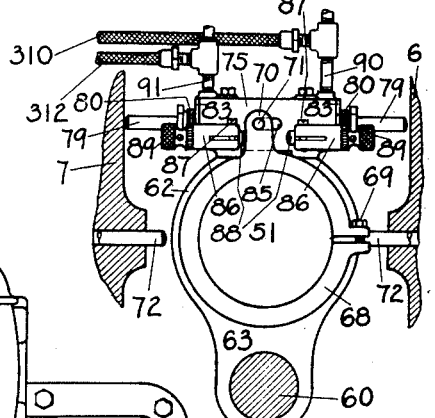

Aug. 14, 1928.

J. L. PERKINS 1,680,802

BEVEL GEAR GENERATOR

Filed June 11, 1925     10 Sheets-Sheet 1

Julian L. Perkins, INVENTOR.

BY

Frank A. Cutter, ATTORNEY.

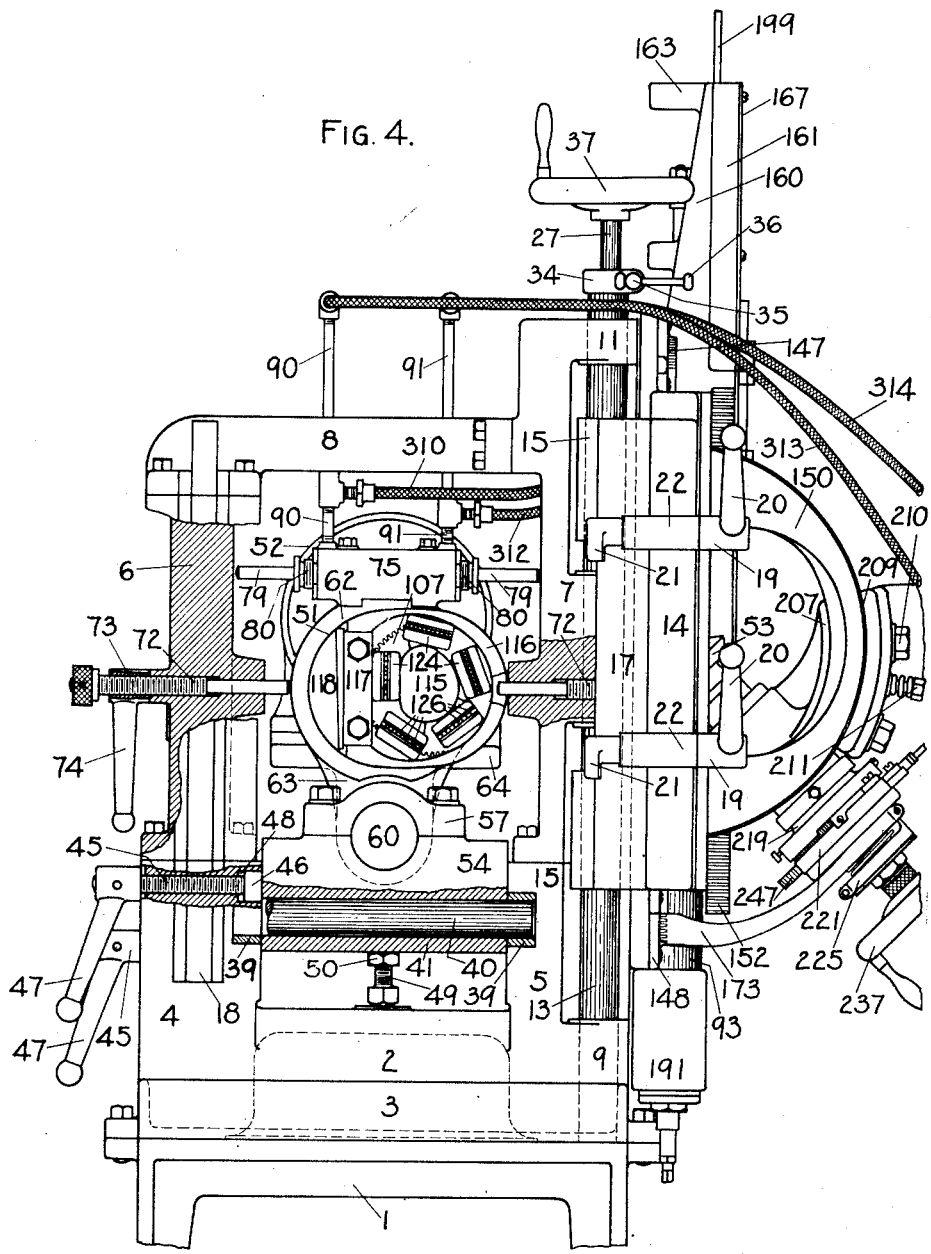

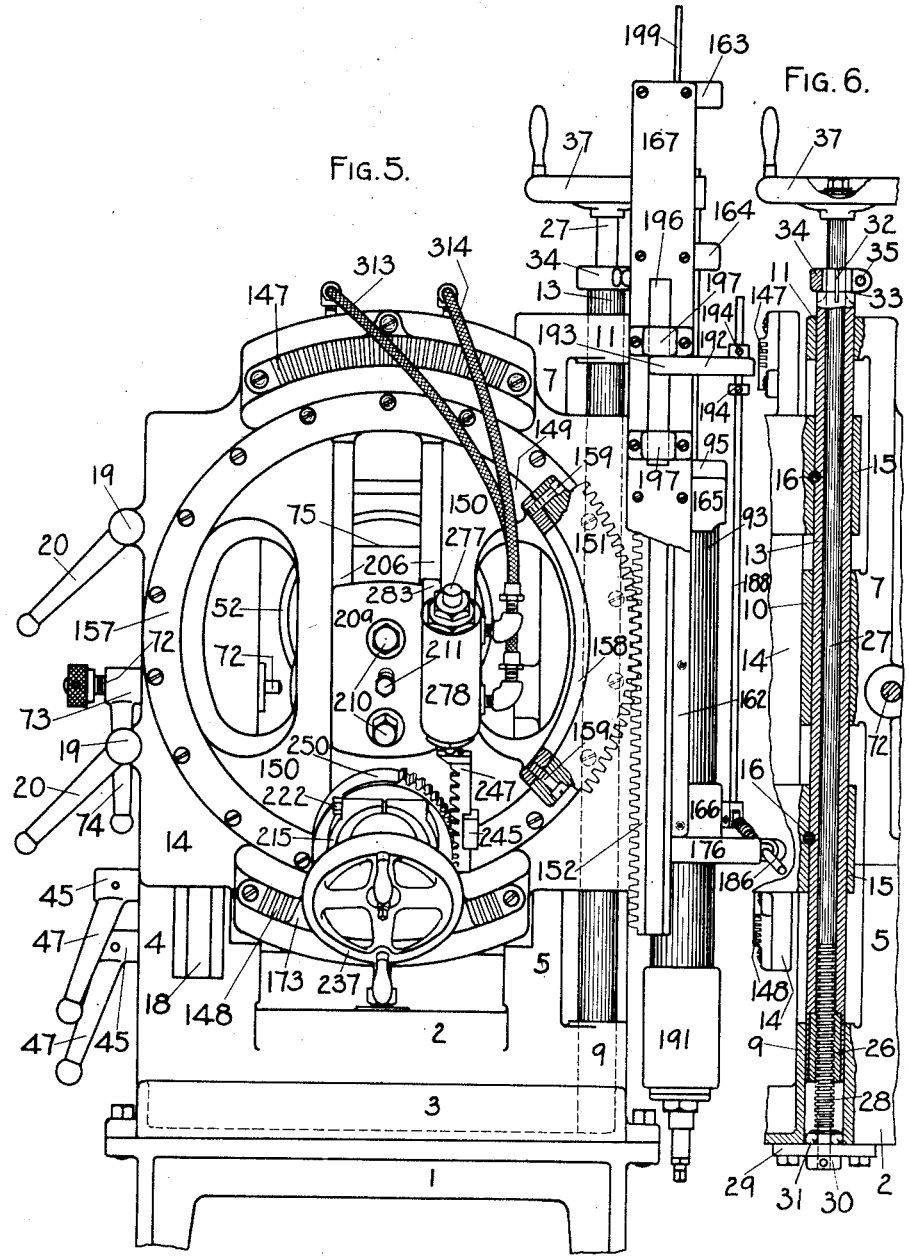

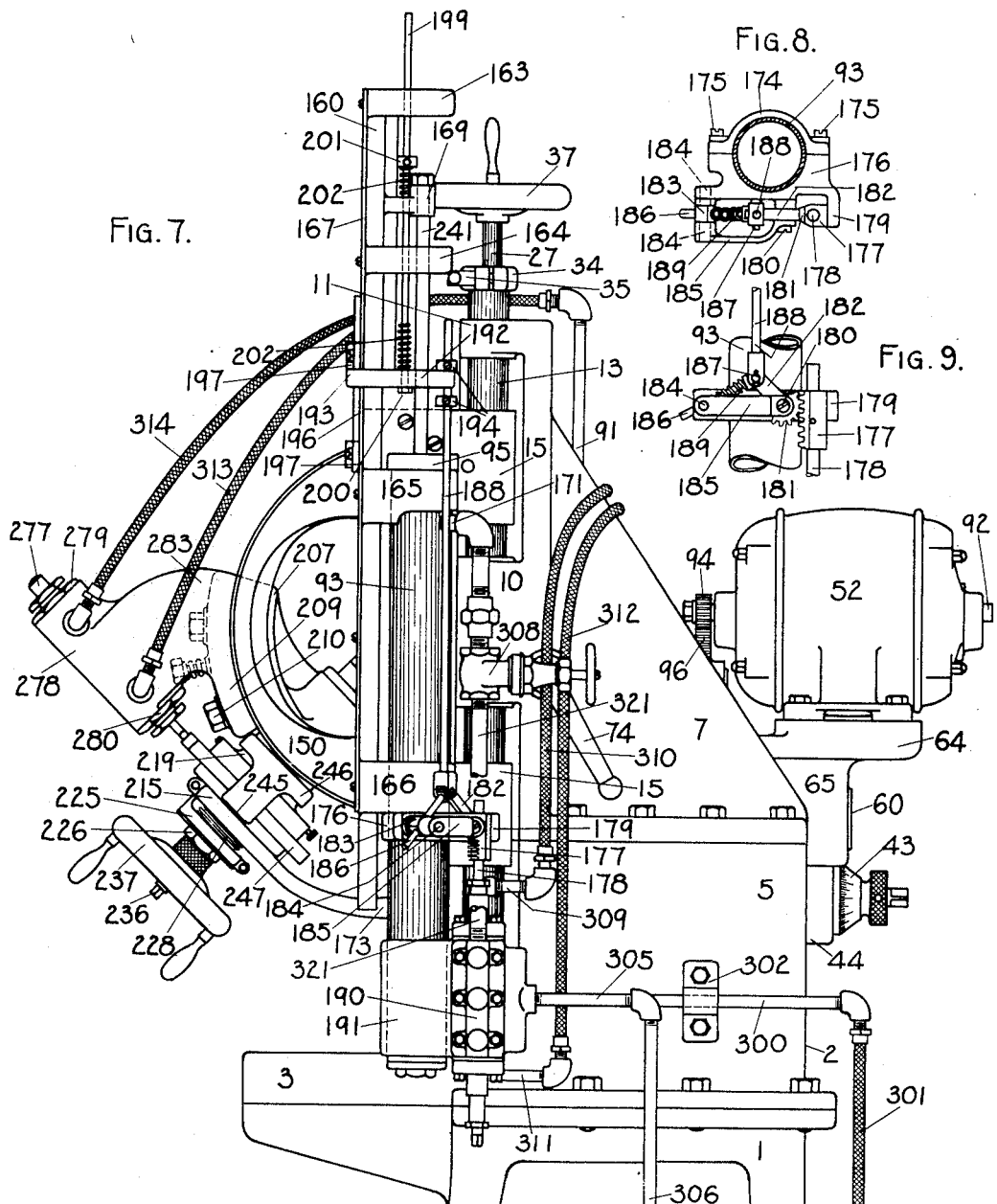

Aug. 14, 1928.

J. L. PERKINS 1,680,802

BEVEL GEAR GENERATOR

Filed June 11, 1925 10 Sheets-Sheet 6

INVENTOR.
Julian L. Perkins,

BY
Frank A. Cutter,
ATTORNEY.

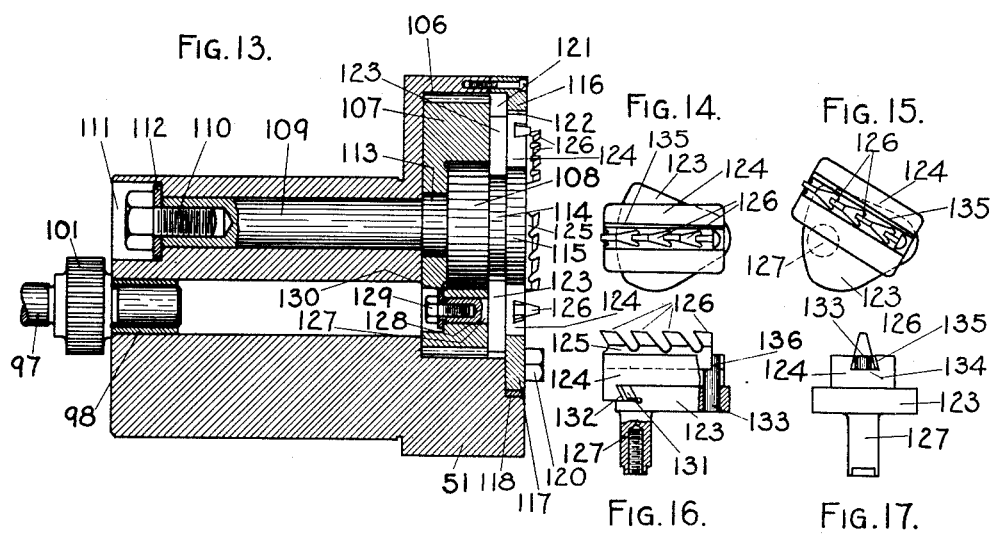

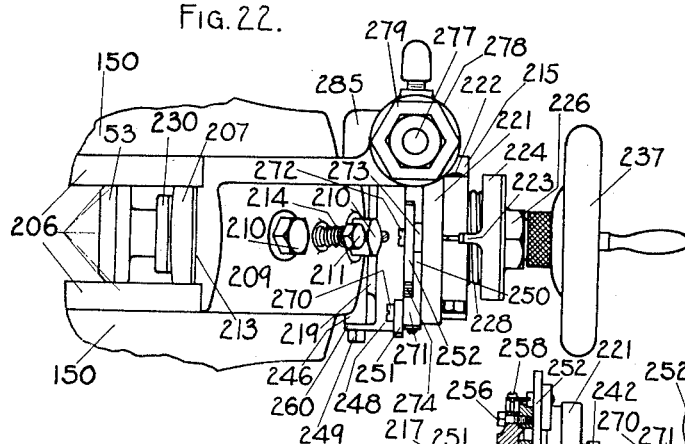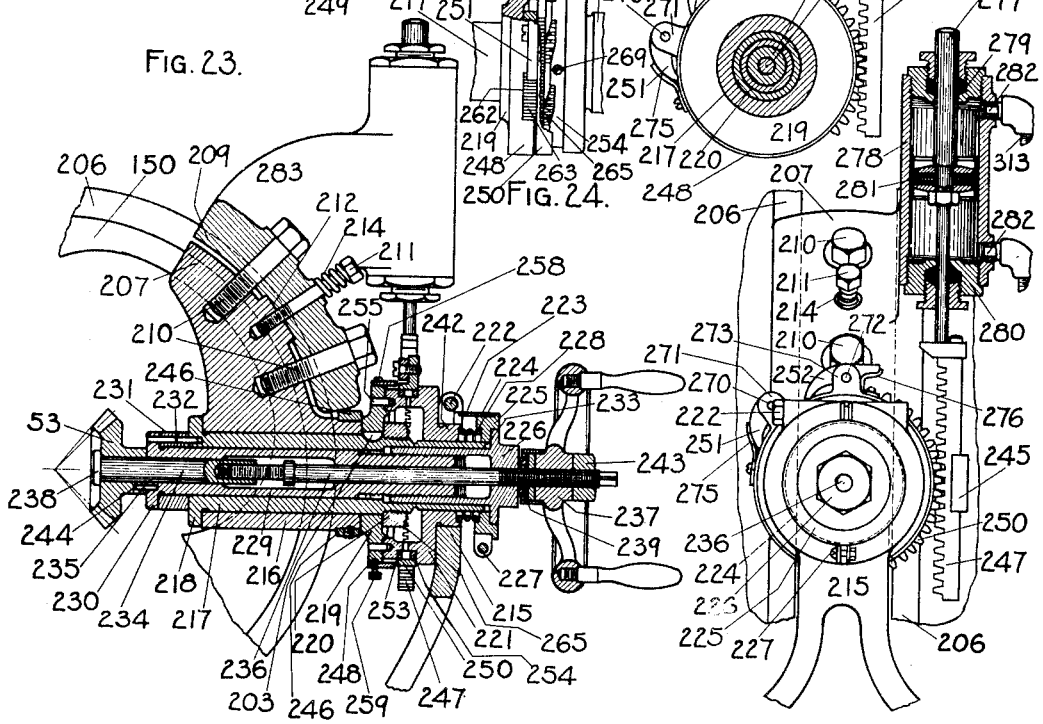

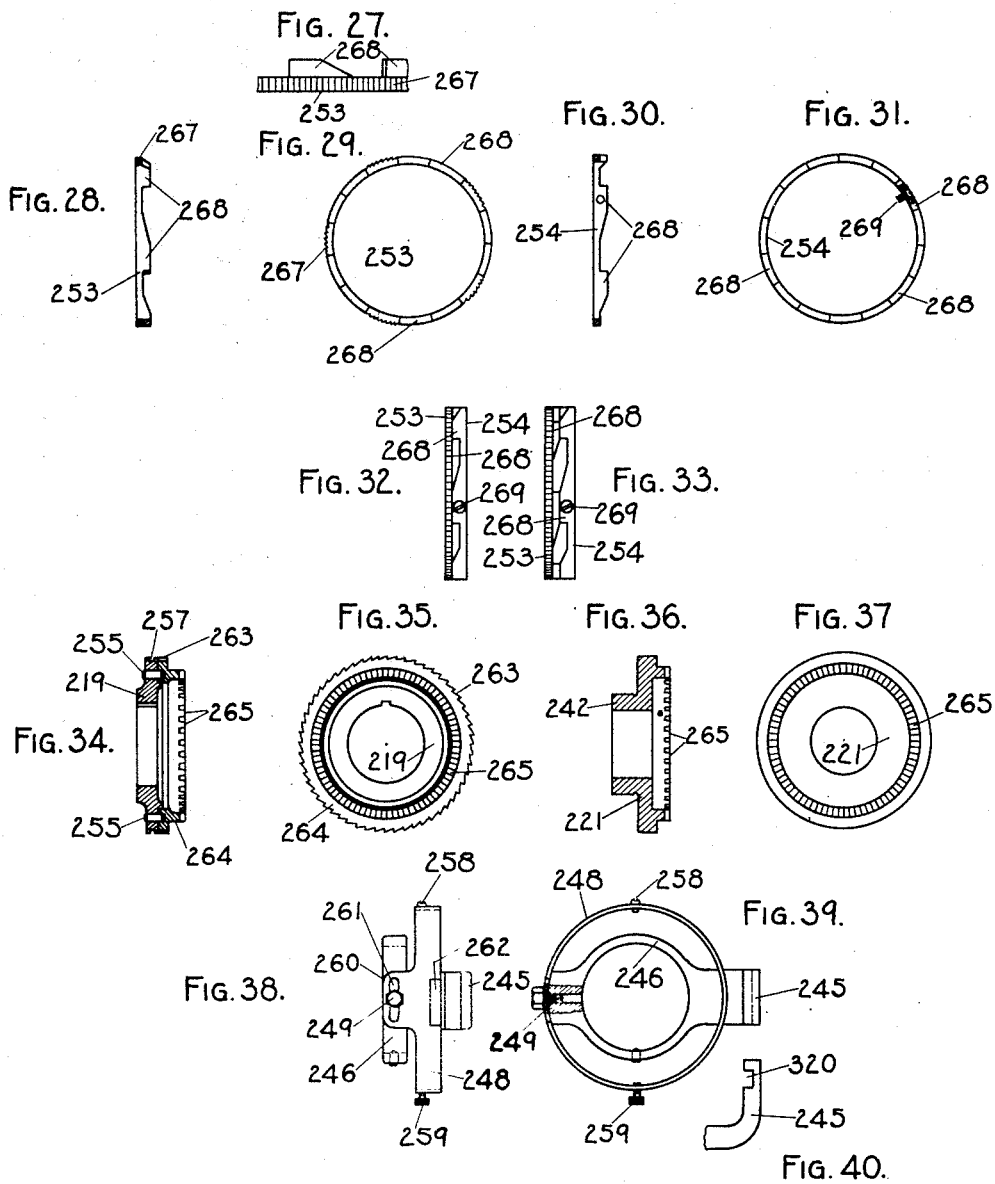

Aug. 14, 1928.
J. L. PERKINS
1,680,802
BEVEL GEAR GENERATOR
Filed June 11, 1925    10 Sheets-Sheet 10
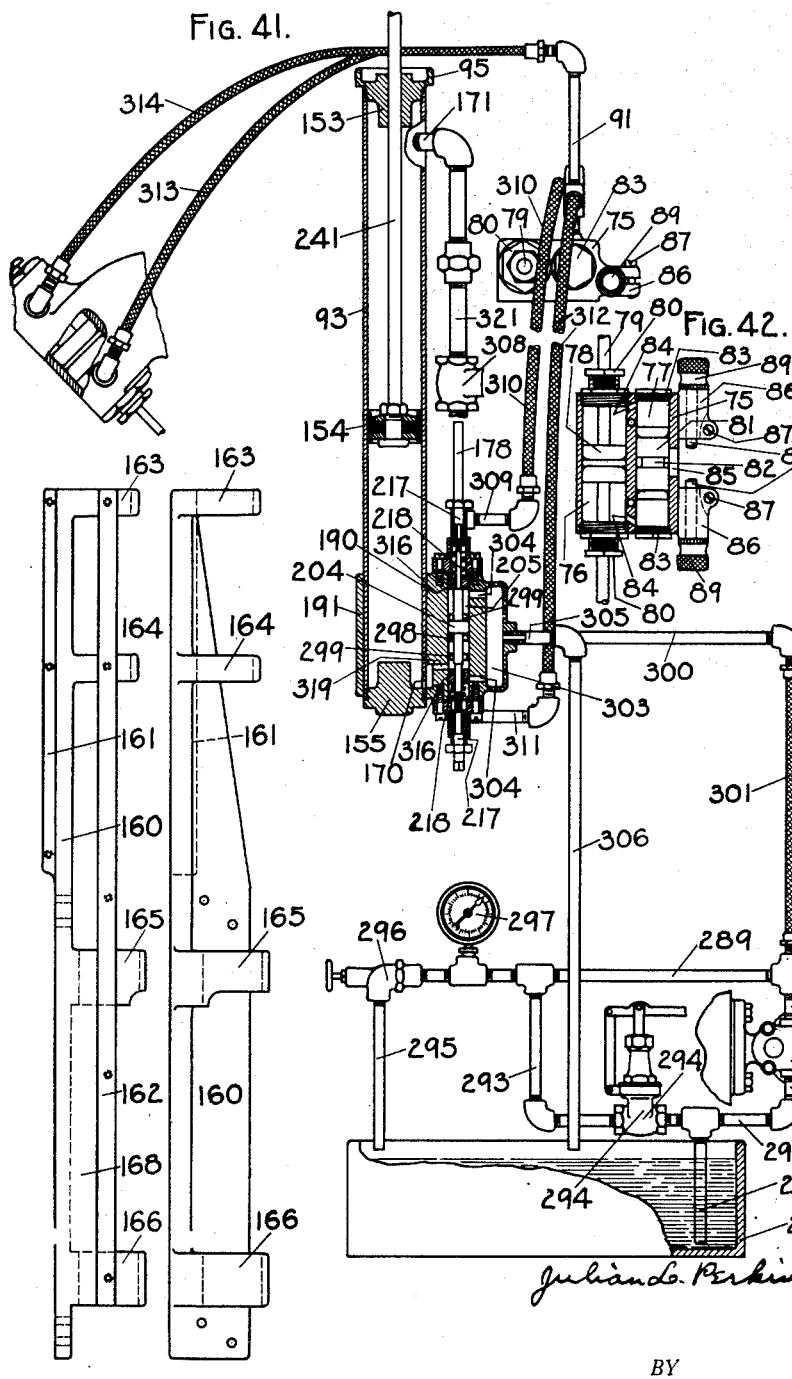
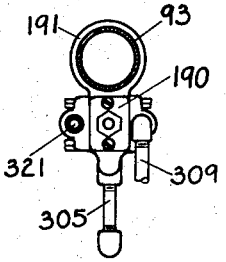
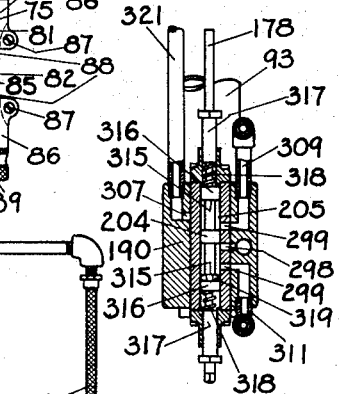
INVENTOR.
Julian L. Perkins,
BY
Frank A. Cutter, ATTORNEY.

Patented Aug. 14, 1928.

1,680,802

UNITED STATES PATENT OFFICE.

JULIAN L. PERKINS, OF WEST SPRINGFIELD, MASSACHUSETTS, ASSIGNOR, BY MESNE ASSIGNMENTS, TO PERKINS MACHINE AND GEAR COMPANY, OF SPRINGFIELD, MASSACHUSETTS, A CORPORATION OF MASSACHUSETTS.

BEVEL-GEAR GENERATOR.

Application filed June 11, 1925. Serial No. 36,431.

My invention relates to improvements in machines for cutting bevel-gears according to the moulding generating principle, and consists generally and in its broader aspect of a supporting structure or frame provided with a gate, a cutter-head, cutters and driving mechanism therefor, work-holding means, indexing mechanism for the work, means to "roll" the work into and out of engagement with the cutters, and hydraulic mechanism to oscillate and partially rotate said cutter-head, to operate said indexing mechanism, to actuate the work-rolling means, and to shift the distributing valve which is an element of said hydraulic mechanism, together with various means for adjusting different elements and mechanisms of the machine, and such other parts and combinations of parts as may be necessary or desirable in order to render the machine complete and serviceable in every respect, all as hereinafter set forth.

One object of my invention is to produce a bevel-gear generator which, while capable of cutting perfect bevel-gear, and possessing all of the advantages necessary in a machine of this character, is of materially reduced size and weight when compared with other types of machines for a similar purpose, and can be manufactured at a correspondingly less expense than can such other types of machines. This machine is compact and its operating parts move in limited spaces, which are features of the utmost importance, inasmuch as they are factors in the amount of room occupied, attention on the part of the operator, and general upkeep, as well as first cost.

Another object is to produce a machine of this character which can be operated with a comparatively small amount of power.

A further object is to provide a bevel-gear generator with cutters which travel in a comparatively small or restricted circuit and pass successively and repeatedly through the work to make the complete cut. In the old types of machines is employed a single cutter of large diameter which passes through the work but once. The advantage of this cutting mechanism over the old cutting mechanism is clearly apparent.

Still another object is to afford adequate means of adjustment for the several mechanisms in my machine, in order that the same shall be capable of performing a wide range of work, or of generating a large number of different sizes of bevel-gears, and of bevel-gears having different sizes and numbers of teeth.

By adjusting the cutter-head of this machine on the axis of said head, skew-teeth on bevel-gears can be cut. Furthermore, by making slight changes in the cutter-head guide and cutter-teeth blocks, spiral teeth on bevel-gears can be cut.

Other objects and advantages will appear in the course of the following description.

A preferred embodiment of the invention, whereby I attain the objects and secure the advantages of the same, is illustrated in the accompanying drawings, and I will proceed to describe the invention with reference to said drawings, although it is to be understood that the form, construction, arrangement, etc. of the parts in various aspects are not material and may be modified without departing from the spirit of the invention.

Figure 2:
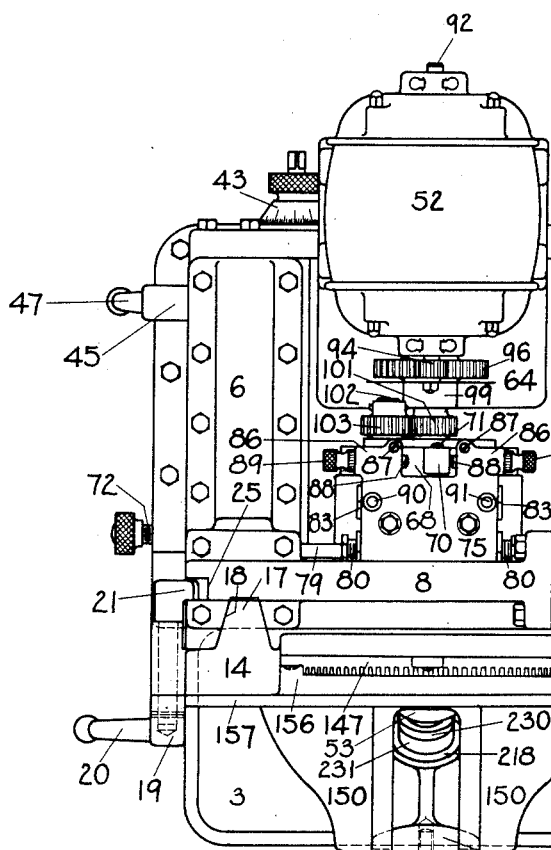
Figure 3:
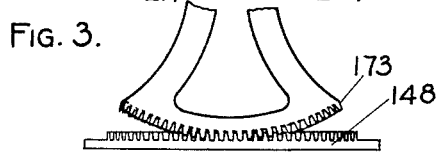
Figure 10:
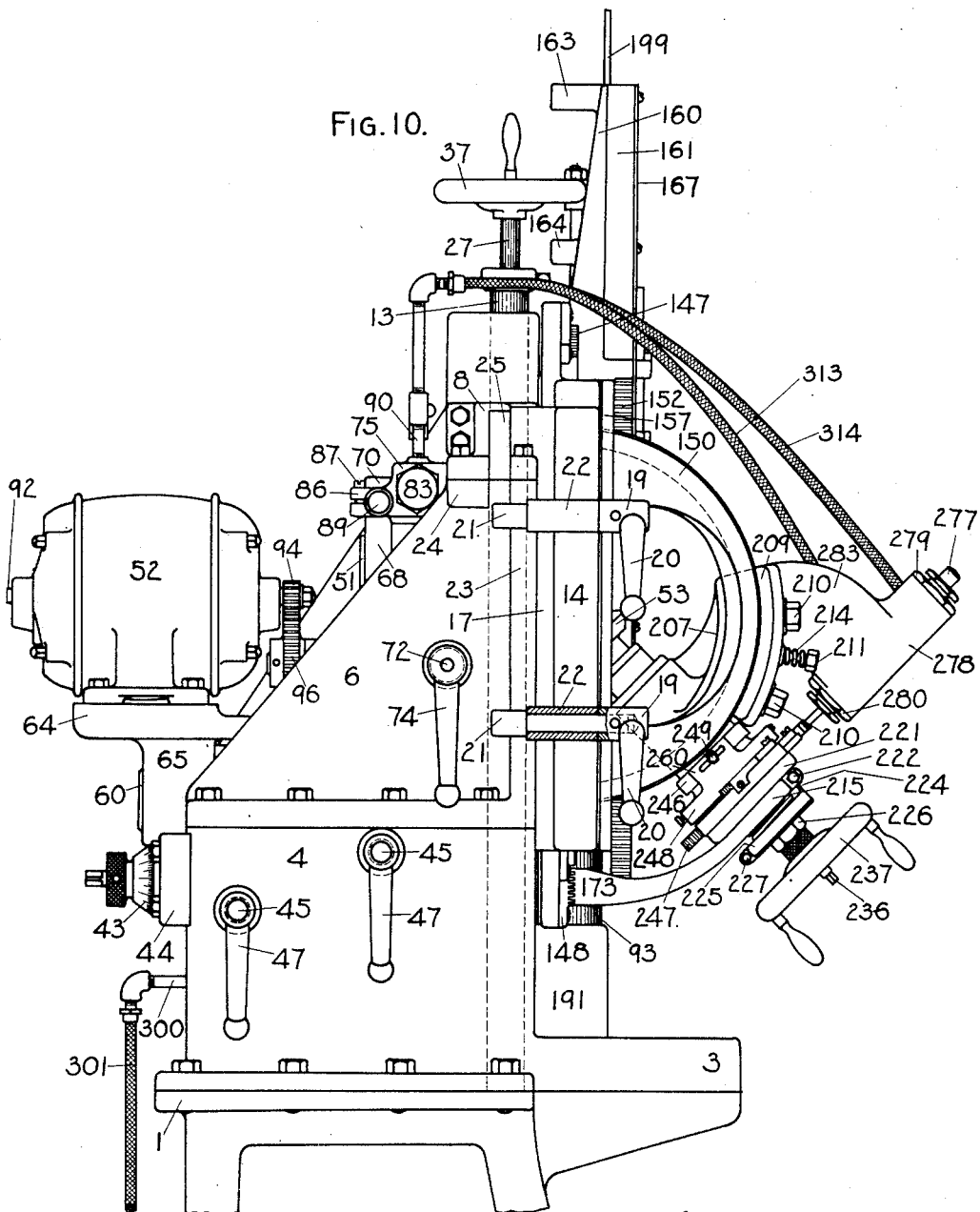
Figures 11, 12:
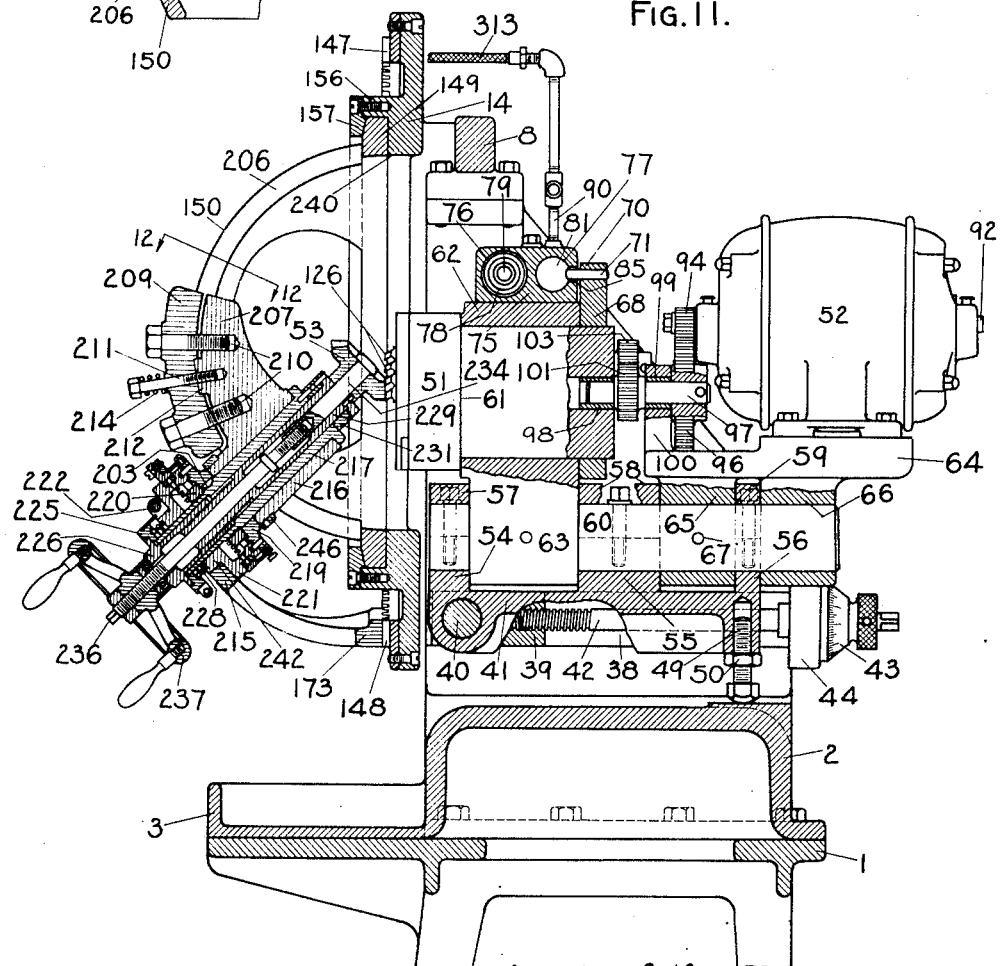

In the drawings, in which similar reference characters designate similar parts throughout the several views, Figure 1 is a top plan of a bevel-gear generator which embodies a practical form of my invention as aforesaid, some parts being broken away and other parts being omitted; Fig. 2, a rear elevation of the cutter-head and the means for partially rotating and oscillating said cutter-head; Fig. 3, a bottom plan of the lower crown-gear segment and the master-gear segment; Fig. 4, a front elevation of said generator, with the gate open and parts in section; Fig. 5, a front elevation of the generator, with said gate closed and minor parts broken away; Fig. 6, a vertical section through the gate-supporting and -elevating means and mechanism; Fig. 7, an elevation of the right-hand side of the generator; Fig. 8, an enlarged top plan of a portion of the distributing-valve-operating mechanism; Fig. 9, a side elevation of the parts and members shown in Fig. 8; Fig. 10, an elevation of the left-hand side of the generator; Fig. 11, a central, vertical section through the generator from front to back; Fig. 12, a cross section taken on lines 12—12, in Fig. 11; Fig. 13, an enlarged, longitudinal, horizontal section through the cutter-head and parts and members carried thereby, looking up; Fig. 14, an enlarged, front elevation of one of the cutting elements; Fig. 15, a similar elevation showing different relative positions of the two blocks of such element; Fig. 16, a side elevation in partial section of the parts and members shown in Fig. 14; Fig. 17, an end elevation of the parts and members as shown and disposed in Figs. 14 and 16; Fig. 18, an enlarged, side elevation in partial section of said cutter-head and parts and members carried thereby; Fig. 19, an enlarged, front end elevation, with parts broken away, of the cutter-head and cutting elements; Fig. 20, an enlarged, front elevation of a cutter-head and cutting elements adapted to generate spiral teeth on bevel-gears, all but one of the cutting elements being omitted; Fig. 21, an enlarged, front elevation of one of the spiral-tooth-cutting elements, this view and Figs. 14, 15, 16, and 17 being on a larger scale than the other views on the same sheet; Fig. 22, an enlarged, top plan of the work-holding, work-rolling, and work-indexing mechanisms; Fig. 23, an enlarged, sectional detail of said last-named mechanisms as viewed from the left-hand side; Fig. 24, an enlarged, left-hand side elevation of certain parts of said indexing mechanism, showing the same disposed in open or unlocked positions or conditions; Fig. 25, an enlarged, front elevation of parts of said indexing mechanism, with the axial members in section; Fig. 26, an enlarged, front elevation of the indexing, work-holding, and work-rolling mechanisms, and vertical section through the cylinder of the hydraulic element which operates the indexing mechanism, the work-clamping wheel being omitted; Fig. 27, a greatly enlarged, fragmentary, edge view of the revoluble cam-ring of the indexing mechanism; Fig. 28, an enlarged section through said cam-ring; Fig. 29, a front elevation of said cam-ring; Fig. 30, an enlarged section through the non-rotary cam-ring of the indexing mechanism; Fig. 31, a rear elevation of said last-named cam-ring; Fig. 32, an enlarged side elevation of said cam-rings in locked position; Fig. 33, a side elevation of said cam-rings in unlocked position; Fig. 34, an enlarged section through the rear indexing clutch-member; Fig. 35, a front elevation of said clutch member; Fig. 36, an enlarged section through the front indexing clutch-member; Fig. 37, a rear elevation of said last-named clutch member; Fig. 38, an enlarged side elevation of the supporting, guiding, and guard members of the indexing mechanism; Fig. 39, a front elevation of said last-named members; Fig. 40, an enlarged, bottom plan of the rack supporting arm; Fig. 41, a detail in elevation and partial section of the hydraulic mechanism as a whole; Fig. 42, a horizontal section through the hydraulic-controlling element for the cutter-head; Fig. 43, a top plan of the distributing-valve of said hydraulic mechanism; Fig. 44, a vertical section through said distributing valve, looking toward the front; Fig. 45, a front elevation of the frame or guide attached to the gate for the long rack, and, Fig. 46, a side elevation of said frame or guide.

In Figs. 1, 7, 10, and 11, as well as in Fig. 5, the gate is shown in its closed position.

My bevel-gear generator, in its present embodiment, includes a frame which comprises a stand or support that sets on the floor, the upper portion of such support being represented at 1, a bed 2 which is mounted on and bolted to the top of said support, and has a forwardly-extending trough 3 to receive the oil and chips or particles that drop from the cutters and the work during the cutting operation, and left- and right-hand side pieces 4 and 5, respectively, left- and right-hand side members or uprights 6 and 7, respectively, that are mounted on and bolted to said side pieces, the upright 6 being on the side piece 4 and the upright 7 on the side piece 5, and a cross piece or yoke 8 having its left-hand terminal resting on and bolted to said upright 6, adjacent to the front edge thereof, and its right-hand terminal placed against the inner face of and bolted to said upright 7, adjacent to the front edge thereof. The bed 2 and the upright 7 are provided with lugs 9, 10, and 11, the two latter being integral with said upright which is cut away to form them. The lug 9 extends to the right from the bed 2 immediately below the lug 10, which latter is between the other two lugs, and all of said lugs are adjacent to the front edges or ends of the side piece 5 and said upright. The aforesaid lugs are perforated to receive a hollow, vertical pivot or hinge rod or sleeve 13.

As an adjunct to the frame of the machine, a movable or swinging member, preferably in the form of a gate 14, is provided, and the same is pivotally connected with or hinged to said frame by means of the hollow rod 13 and the lugs 9, 10, and 11, said gate being provided at one longitudinal edge with lugs 15—15 through which said rod also passes. The hollow rod 13 is pinned at 16—16, Fig. 6, to the lugs 15. On the inside face of the gate 14, adjacent to the edge thereof which is opposite to that where the lugs 15 are located, is a vertical flange 17, and such flange is adapted to be received in and fit a vertical slot 18, when the gate is closed. The slot 18 is formed in the front edges or ends of the side piece 4 and the upright 6 and in the front side of the yoke 8. As locking means for the gate 14, when closed, two horizontal latch bolts 19 are provided. Each of these bolts or latches has a handle 20 at its outer end and a hook 21 at its inner end, and is rotatably mounted in a lug 22 on the edge of the gate to which the flange 17 is adjacent. There is a vertical flange 23 on the outside at the front edge or end of the upright 6, and a horizontal flange 24 on the outside at the top of said upright, and such top flange and the adjacent end of the yoke 8 are recessed vertically to form a slot 25 the front side of which is continuous with the back side of the vertical flange. The bolt hooks 21 are receivable behind the flange 23 and the upper hook in the slot 25 behind the front edge thereof. When the gate 14 is swung on its hinges to close the same, the flange 17 enters the slot 18, and the latches 19 are partially rotated to thrust their hooks 21 behind the flange 23, or the upper hook behind the front side of the slot 25 and the lower hook behind said flange 23, in the event said gate be in a sufficiently elevated position. Thus the gate is held securely and rigidly against the front side of the frame of the machine. Upon partially rotating the latches 19 to withdraw their hooks from locking position, the gate can be opened by swinging it on its hinges outwardly.

It is necessary to adjust the gate 14 vertically in order to locate the work, or the bevel-gear blank being cut, on a level approximately with the active cutter, or in position to be moved into the cutting field, and to this end is provided the adjusting mechanism illustrated more fully in Fig. 6, and which is described below.

In the bottom part of the hollow rod 13 is an internally screw-threaded bushing 26, and passing through and extending beyond said rod at both ends is a solid rod 27, the latter having a screw-threaded part 28 to engage said bushing. The rod 27 is the lifting or adjusting member. A horizontal plate 29 is bolted to the under side of the lug 9, and the base of the rod 27 extends through and has a nut 30 secured thereto beneath said plate. A ball-bearing 31 is located in the lug 9 between the top of the plate 29 and the screw-threaded part 28, and the weight of the gate 14 is carried on said ball-bearing, being transmitted thereto through the medium of the lugs 15, the pins 16, the hollow rod 13, the bushing 26, and the rod 27. This ball-bearing, therefore, provides an anti-friction support for the gate when swung into open or closed position, and the same is itself supported on and by the plate 29. The upper terminal of the hollow rod 13 is split vertically, as represented at 32, and the split part is shouldered, as represented at 33. Mounted on the rod 13 below the shoulder 33 is a split-ring 34 provided with a clamping screw or bolt 35 having a handle 36. Secured to the rod 27 at the top is a hand-wheel 37.

To adjust the gate 14, loosen the bolt 35, and by means of the hand wheel 37 rotate the rod 27 in the direction to screw the bushing 26 either up or down, accordingly as it be desired to raise or lower said gate. The movement imparted by the threaded part 28 of the rod 27 to the bushing 26 is transmitted to the rod 13 and the gate. After the gate has been located at the desired elevation, the bolt 35 is retightened to contract the split-ring 34 on the split portion of the rod 13 and cause the same to contract and bind on the rod 37, thus preventing further movement of said last-named rod independently of said first-named rod.

Referring next more particularly to Figs. 4 and 11, it will be seen that there are oppositely-disposed, horizontal grooves or slots 38—38 in the inner faces of the side pieces 4 and 5, and that arranged to slide in such slots are two blocks 39. Connecting the blocks 39 is a shaft 40, and mounted at the front end on said shaft is a carrier 41. The blocks 39 and shaft 40 form what may be termed a carriage. This carrier supports the cutter-head, the electric motor which drives the same, and other parts and members. Means are provided to adjust the carriage longitudinally or move the same either forwardly or rearwardly; and means are provided to tilt the carrier either up or down on the shaft 40. The longitudinal adjustment of the carriage and with it the carrier and cutter-head is for the purpose of so setting the cutting elements as to obtain therewith the required depth between the teeth being cut thereby, and the tilting adjustment of said carrier and with it said cutter-head is for the purpose of so setting said elements as to obtain therewith the required cutting angle.

The carriage is adjusted longitudinally through the medium of a horizontal screw 42 which is provided with a micrometer adjustment 43. The screw 42 is carried at the rear terminal in a lug 44 with which the back edge of the side piece 4 is provided, and has its forward terminal tapped into the carriage block 39 that is in the slot 38 in said side piece. The micrometer-adjustment 43 is outside of or behind the lug 44, and the forward terminal of the screw 42 enters the block 39 engaged thereby at the back end of said block. When the screw 42 is rotated in one direction and the connected block 39 is actuated forward it carries with it the shaft 40, the other block 39, and the carrier 41, and when said screw is rotated in the other direction the connected parts and members or the carriage and carrier are actuated rearward.

To secure the carriage in place, after adjustment, two lock bolts 45 are tapped into the side piece 4 from the outside and in proper positions to bear at their inner ends against the contiguous side of the carrier 41. At the inner end of each bolt 45 is a head 46, and this head comes into direct contact with the carrier. At the outer end of each bolt 45 is a handle 47. The bolts 45 are arranged to clear the left-hand carriage block 39, and to engage the carrier 41 regardless of the positions of said block and carrier, said bolts being so disposed that one of the heads 46 is above the top horizontal plane and the other head 46 is below the bottom horizontal plane of said block. Thus the bolts 47 when tightened bear against the carrier above and below its horizontal center, and force said carrier tightly against the side piece 5, thereby holding the same firmly and securely in place. The same lock bolts also securely hold the carrier after it has been adjusted on the carriage shaft 40, as will presently appear. At each point where is located one of the heads 46 in the side piece 4, the latter is recessed to accommodate such head, as indicated at 48 in Fig. 4. These two recesses open into the slot 38 in the side piece 4.

For the purpose of rocking the carrier 41 on the shaft 40, or, in other words, tilting said carrier, an approximately vertical bolt 49 is tapped into the carrier from below and adjacent to the back end thereof, the head of said bolt resting on the bed 2 between the side pieces 4 and 5. There is a lock-nut 50 on the bolt 49 to bear against the bottom of the carrier 41 and secure said bolt after adjustment.

To tilt the carrier 41, loosen the lock-nut 50, and screw the bolt 49 either up or down accordingly as it be desired to increase or decrease the angle of said carrier, and then retighten said nut. This adjustment and the longitudinal adjustment of the carriage and carrier, either or both of such adjustments, are made while the lock bolts 45 are loosened, and after adjustment said lock bolts are retightened.

The cutter-head and the electric motor, hereinbefore referred to, are respectively designated by the numerals 51 and 52, and the work, blank, or bevel-gear being cut, is designated by the numeral 53.

The carrier 41 is provided on top with transverse front, intermediate, and rear bearings 54, 55, and 56, respectively, and caps are bolted to each of these bearings. The front cap is designated by the numeral 57, the intermediate cap by the numeral 58, and the rear cap by the numeral 59. Mounted in the bearings 54, 55, and 56, beneath the caps 57, 58, and 59, is a shaft 60. The cutter-head 51 has an annular shoulder at 61, and that part of said cutter-head which is behind said shoulder is cylindrical and is received in a ring-bearing 62 which has a downwardly-extending lug 63 that is mounted on and rigidly secured to the shaft 60 between the bearings 54 and 55 and the caps 57 and 58. The cutter-head 51 in front of the shoulder 61 is elliptical as best shown in the several front elevations thereof. The cutter-head is adapted to rotate in the ring-bearing 62, although the amount of such rotation is small. The electric motor 52 is mounted on and bolted to a horizontal bed 64, and such bed is provided with downwardly-extending lugs 65 and 66. The lugs 65 and 66 are mounted on the shaft 60 with the bearing 56 and the cap 59 between said lugs. The lug 65 is between the bearings 55 and 56, and is pinned at 67 to the shaft 60. The lugs 63 and 65 are held against endwise movement by the bearings 54, 55, and 56, and said lugs being fast to the shaft 60 rock together with said shaft and carry with them the parts above. A split-ring 68 is mounted on the cylindrical part of the cutter-head 51 behind the ring-bearing 62, and clamped and secured thereon by means of a bolt 69, as shown in Fig. 2. Upon loosening the bolt 69, the split-ring ring 68 can be adjusted on the cylindrical part of the cutter-head. A lug 70 rises from the top of the split-ring 68, and a pin 71 is set in said lug and projects forwardly beyond the same.

Two stop screws 72 are tapped into and through the uprights 6 and 7 of the frame, with their axes in line with the horizontal diameter of the ring-bearing 62. These screws thus disposed or located limit the oscillatory movement of the cutter-head 51, by reason of the fact that the inner ends of said screws are in the path of the ring-bearing 62 which rocks or oscillates on and with the shaft 60. By adjusting the screws 72 in or out, the amount of oscillation permitted the ring-bearing 62 is accordingly decreased or increased. Each screw 72 is provided with a set-nut 73 having a handle 74, such set-nut being mounted on said screw between the head of the same and the adjacent side of the frame or of a boss on said side through which the screw passes. After the screws 72 have been adjusted to the required extent, the set-nuts 73 are screwed tightly against the bosses on the sides of the frame to prevent said screws from becoming loosened or being accidentally diplaced from the positions in which they are set. Before the screw 72 can be readjusted, it is necessary, of course, to loosen the set-nuts 73.

As previously stated or intimated, the longitudinal adjustment of the carriage, and, therefore, of the carrier 41 and the cutter-head 51, causes the cutter to be advanced the required distance to position the same for cutting the teeth to the required depth in the gear blank 53, and the tilting adjustment of said carrier, and therefore, said cutter-head, positions said cutter at the angle necessary to conform to the angle of the bottom of the slot between the two teeth being cut, or to the cutting angle. The oscillatory movement of the ring-bearing 62 on and with the shaft 60, which is imparted to the cutter-head 51 carried or supported by said ring-bearing, is necessary in order to make up or compensate for the difference between the width of the cutter and the slot in the blank 53, it being understood that said cutter is narrower than the slot required to be cut thereby; and the partial rotation of said cutter-head in said ring-bearing on the axis common to both causes the cutter to conform to the angles of the sides of said slot, it being remembered that the space, groove, or slot between the two teeth differs in width at the ends, or, in other words, that the adjacent sides of two adjacent teeth form angles with the longitudinal center of the slot between, which angles are wider at their outer ends than at their inner ends. It is necessary that the cutter be of less width than the width of the slot between two adjacent teeth, because of the angularity of the sides of such slot above referred to, and it is due to this fact that, after the cutter has cut one side of the slot, it be moved over to cut the other side, and it is to effect this movement that means for oscillating the cutter-head 51 is provided. In connection with the tilting adjustment for the cutter-head, it may be more clearly understood why the same is provided if it be remembered that the slot between the two adjacent teeth is deeper at the outer end than it is at the inner end, so that the cutter must be tilted to conform to such difference or to conform to the inclination of the floor of the slot.

An approximately horizontal, twin-cylinder casing 75 is mounted on and bolted to the top of the bearing-ring 62—see Figs. 1, 2, 4, 11, and 42. The casing 75 is at right-angles to the vertical plane of the axis of the bearing-ring 62 and the cutter-head 51, and within the same are front and back chambers 76 and 77, respectively. Within the chamber 76 is a piston 78 having a stem 79 which extends from opposite sides of said piston to and through stuffing-boxes 80—80 in the ends of said chamber. The length of the stem 79 is a trifle less than the distance between the inner faces of the frame uprights 6 and 7, in order to permit said stem to be tilted when the parts are operated. Within the chamber 77 is a piston 81 having a central, annular groove 82 therein. The ends of the chamber 77 are closed by means of screw-caps 83—83. The chambers 76 and 77 communicate with each other through two ports 84 in the partition between said chambers, such ports being on opposite sides of the pistons 78 and 81. In the center of the back side of the chamber 77 is a longitudinal slot 85. The pin 71 extends through the slot 85 and projects into the groove 82. On the back side of the casing 75 are two horizontal sleeves 86 which are spaced apart to receive between them the lug 70. The inner terminals of the sleeves 86 are split and provided with clamping screws 87—87 with which the split parts may be contracted. Two horizontal stop pins 88 are arranged for longitudinal adjustment in the sleeves 86, such pins being provided at their outer terminals with micrometer adjustments 89—89. The pins 88 at their inner terminals project beyond the inner ends of the sleeves 86 into the path of the lug 70 to limit the movements in both directions of said lug. The screws 87 are tightened to contract the split parts of the sleeves 86 on the pins 88, after the latter have been adjusted by means of the micrometer adjustments 89.

The twin-cylinder casing 75, with its parts and members, is an element of the hydraulic mechanism of the machine, and the fluid enters the chamber 77, on the left-hand side of the piston 81 (the space above said piston in Fig. 42), through a vertical pipe 90, and said fluid enters said chamber, on the left-hand side of said piston (the space below said piston in Fig. 42), through a vertical pipe 91.

When the fluid enters the chamber 77 through the pipe 90 it forces the piston 81 to the right, and said piston carries with it the pin 71 and the lug 70, thus imparting a partial revolution to the cutter-head 51 in the bearing-ring 62, through the medium of the split-ring 68, the amount of such partial revolution being determined by the right-hand stop pin 88, against which said lug strikes and comes to rest. This partial revolution of the cutter-head 51 is to the right. The fluid in the chamber 77 at the right of the piston 81 is forced out through the pipe 91. At practically the same time the fluid entering the chamber 77 passes through the left-hand port 84 into the chamber 76, and forces the casing 75 to the left, because the right-hand end of the stem 80 of the piston 78 is bearing against the frame upright 7, with the result that the bearing-ring 62 with the cutter-head 51 is rocked on and with the shaft 60 to the left until said bearing-ring strikes and comes to rest against the left-hand stop screw 72. Meanwhile the fluid in the chamber 76 at the right of the piston 78 is forced through the right-hand port 84 into the chamber 77 at the right of the piston 81, and, with the fluid in the rear chamber at the right of the piston therein, exhausts through the pipe 91. Just the reverse of these operations takes place when the fluid enters the back chamber through the pipe 91, the cutter-head 51 then being partially rotated to the left as far as permitted by the left-hand stop-pin 88, and the bearing-ring 62 being rocked to the right as far as permitted by the right-hand stop screw 72. These movements thus imparted to the cutter-head properly position the cutter to cut one side of a tooth at the required angle and then to cut the adjacent side of the next tooth at the required angle, one angle being the complement of the other. The slot 85 is of sufficient length and width to enable the pin 71 to move in either direction the maximum distance required, and to allow for the slight arc described by said pin in its movement.

It is to be understood that the movement of the piston 81 in the chamber 77 and the movement of the casing 75 produced by the impinging of the fluid on the piston 78 are almost simultaneous, and that such movements complement each other, and the resulting movements of the cutter-head or of a compensatory character. The parts actuated into the changed position by the piston 81 remain in such position relatively during the practically simultaneous action imparted to the casing 75.

It is usual, in setting the mechanism last described, first to locate or adjust the stop screws 72 in such a manner that each takes care of one-half of the difference between the width of the cutter and the width of the tooth slot, and then to set the stop pins 88 in such a manner that each takes care of the tooth angle on one side of the tooth slot.

The electric motor 52 is provided with a shaft 92, and said motor is so mounted on the bed 64 that said shaft is in the central, vertical plane of the machine, which plane extends from front to back. Secured to the forward protruding terminal of the shaft 92 is a pinion 94. The pinion 94 intermeshes with a gear 96 below said pinion, which gear is secured to a horizontal shaft 97 that has its front terminal journaled in a bushed bearing 98 in the axial center of the rear end of the cutter-head 51, and its rear terminal journaled in a bushed bearing 99 provided in an upright 100 that rises from the bed 64 at the front end thereof. These parts and members are clearly shown in Figs. 1, 11, 13, and 18. The gear 96 is secured to the shaft 97 behind the upright 100, and secured to said shaft in front of said upright is a gear 101. A horizontal shaft 102 is journaled in the cutter-head 51 above the horizontal plane of the axial center thereof and to the left of the vertical plane of such center. The shaft 102 protrudes from the rear end of the cutter-head 51, and secured on said protruding part is a gear 103. The gear 103 intermeshes with the gear 101. Secured to the shaft 102 at its front or inner terminal, in a recess 104 in the cutter-head 51, is a pinion 105. The front-end portion of the cutter-head 51, or that portion of the same which is in front of the shoulder 61, is elliptical, and extends farther to the left of the cylindrical or barrel portion of said cutter-head than it does to the right or above or below such portion, as shown in Figs. 4, 13, 19, and 20. The elliptical portion of the cutter-head 51 is recessed, as shown at 106, to receive a large gear 107, such recess opening through the front end of said cutter-head. The gear 107 is mounted on an enlarged part or head 108 of a horizontal stud 109, which is located in the cutter-head 51, and secured therein by means of a bolt 110. The stud 109 is located in the horizontal, central plane of the cutter-head 51, but a little to the right of the vertical plane of the axis. At the rear end the cutter-head 51 is recessed at 111 to accommodate the head of a bolt 110, and a washer 112 that is interposed between said head and the inner end of the recess. The head 108 has a hub 113 that is forced against the back side of the recess 106, and the washer 112 is forced against the front side of the recess 111, when the bolt 110 is tightened. In this manner and by this means the spindle 109 is held securely in place in the cutter-head 51. The gear 107 is free to rotate on the head 108 and hub 113. Integral with the hub 108, on the front side thereof, are inner and outer fixed cam members or guides 114 and 115, the latter being larger than the former. A curved rim member 116 is let into the front side of the cutter-head 51 and secured thereto by means of screws, the outer edge of such member coinciding with the outer edge of the contiguous part of said cutter-head, and said member, at the left having upper and under terminals with inner parallel and approximately horizontal edges. The rim member 116 projects over portions of the recess in the front side of the cutter-head 51. Secured to the front side of the cutter-head, between the parallel end edges of the rim member 116, is an approximately vertical guide-plate 117, and between the left-hand edge of such plate and the adjacent edge of a projecting part 172 of said cutter-head is a wedge 118. The wedge 118 is introduced from above, after the guide-plate 117 has been adjusted, and is for the purpose of taking up wear. There are two transverse slots 119 in the guide-plate 117, and bolts 120—120 are passed through said slots to be tapped into the cutter-head behind. When the bolts 120 are loosened the guide-plate 117 can be adjusted either to the right or left, and, after proper adjustment, said bolts are re-tightened. The wedge 118 is then inserted between an abutment afforded by the raised part 172 of the cutter-head at the left and the guide-plate 117 at the right. The front end of the cutter-head is cut away, in the manner indicated, to provide seats for the guide plate 117 and wedge 118 and the abutment for the latter. Parts of the cutter-head 51, the rim member 116, and the guide-plate 117 form a channel 121 in front of the gear 107 and around the guide 114, said rim member and guide-plate extending over portions of said channel. Another channel 122 is formed between the guide 115 and the rim member 116 and guide-plate 117. The guide-plate 117 is of the same thickness as and in the same vertical plane with the guide 115, and that portion of said guide which is immediately adjacent to the right-hand edge of said guide-plate is parallel with said edge. Two circuitous paths are thus formed around a forward projection of the axis of the gear 107.

Each of the cutters, of which in the present example there are five, although there might be more or less, comprises an inner plate or block 123, an outer plate or block 124, and a cutter-bar 125 provided with four, more or less, teeth 126. Each tooth 126 is a little less in width than the space between two teeth cut in the blank 53. Each block 123 is provided on the back side adjacent to one end with a trunnion 127 which is receivable in an opening 128 in the gear 107 parallel with the axis of said gear, and such trunnion is held in place in such opening by means of a bolt 129 and a washer 130, such washer being interposed between the head of said bolt and the back edge of said opening. The gear 107 is recessed behind the opening 128 to accommodate the washer 130 and the head of the head of the bolt 129, and the trunnion 127 is shouldered in front of said washer, as shown in Figs 13 and 16, to prevent the washer from binding on the trunnion and interfering with the free movement of the same on its axis. The block 123 has an arcuate, undercut portion 131 in the front side at the end where is located the trunnion 127, and engaging such portion is an arcuate, beveled part 132 on the back side of the associated block 124 in front. The blocks 123 and 124, in each pair or set, are pivotally connected at their ends which are opposite to the arcuate parts 131 and 132, as at 133. In the longitudinal center of the outer face of each block 124 is a slot or groove 134 having undercut sides, and each cutter-bar 125 has longitudinal sides which are inclined to fit within said groove. A wedge 135 is employed to secure each cutter-bar 125 in its groove 134 after said cutter-bar has been properly positioned therein. Each pivot pin 133 is cut away at the forward terminal, as shown at 136 in Fig. 16, to receive the contiguous end portion of the cutter-bar 125 which is associated with said pin. The pin 133 is, therefore, held in place between the face of the gear 107 and the back side of the cutter-bar. The teeth 126 in each set are on the front side of one of the cutter-bars 125, and thus have a forward projection, and they are arranged so that their cutting edges lead in the direction of movement of the cutter. The blocks 123 and 124 in each pair are free to swing on their pivot 133, the arcuate parts 131 and 132 sliding one upon the other, and said block 123 is free to swing on the face of the gear 107 with the trunnion of said last-named block as a center or pivotal point. As will presently more fully appear, the power exerted during the cutting stroke or cutting operation is applied through each trunnion 127 to its block 123, and then through the arcuate, beveled parts 131 and 132 to the associated block 124, thus taking the strain from the pivot 133, in any cutter or cutting unit. The parts 131 and 132, being positioned as they are and interlocking as they do, obviate any liability of breaking or springing the parts of the cutter during the cutting operation thereof, as will be clearly seen. Not only is each cutter-bar 125 held in its block 124 by the wedge 135 inserted in the groove 134, but said cutter-bar is further supported by that portion of the contiguous pivot 133 which extends into engagement with the back end of said cutter-bar in the direction of travel thereof. A sufficiently strong abutment for the cutter-bar is thus provided, and such abutment assists in carrying the strain during the cutting operation. The trunnion 127 and the interlocking or interengaging parts 131 and 132 are adjacent to the front ends of the blocks 123 and 124 in each cutter, while the associated pivot 133 is adjacent to the rear ends of said blocks, in the direction of movement.

The blocks 123 are carried around by the gear 107 in the channel 121, and the blocks 124 with their cutter-bars 125 are carried around, with said first-named blocks, in the channel 122. Each of the guides 114 and 115 is of an irregular shape substantially as shown in Fig. 19, the former has a straight vertical edge which is parallel with the adjacent vertical edge of the guide-plate 117, as previously noted, and the latter has a point, as represented at 137, at the outer end of an approximately 45° radius extending from the axis of the guide upwardly and to the left. The blocks 123 seldom contact with the guide 114 except at the point 137, but the blocks 124 contact with the guide 115 throughout the larger part of the course of their travel.

As any given cutter is carried downwardly by the gear 107, the block 124 passes and rides between and is accurately guided in an approximately vertical path downwardly by the guide-plate 117 and the straight edge of the guide 115, and such block and the block 123 behind are in substantially the relationship as that shown in Figs. 14 and 19. As the gear 107 continues to revolve, the block 124 passes clear of the guide-plate 117 and guide 115, and may be swung outwardly by centrifugal force until the leading outer corner of the same bears or rides against the outer side at the bottom of the channel 122. A little later the block 124 at its inner longitudinal edge passes into contact again with the guide 115, while still riding on the outer side of the channel 122. Little change takes place until the cutter blocks pass through the upper portions of the channels 121 and 122, when said blocks assume the relative positions shown in Fig. 15. If the blocks remained in the positions just referred to, the block 124 would strike head on the guide-plate 117, instead of entering between said guide-plate and the guide 115. This fatal result is prevented by the presence of the high part or point of the guide 114 into contact with which next comes the new lower leading part or corner of the block 123. As such corner of the block 123 rides over the high part 137 of the guide 114, the rear end of said block is thrown upwardly and carries with it the pivot 133 and the rear end of the block 124 connected with said first-named block, thus positioning the block 124, as shown at the top in Fig. 19, in readiness to descend and enter between the guide-plate 117 and the straight part of the guide 115. Without provision of the character just described, it would be necessary to carry the cutters through a circular course, and such course would have to be very much larger than the irregular course through which the blocks 124 are now carried, involving the necessity for a much larger and much more expensive machine, and a machine which would require a great deal more power to drive. The cutters in the present case ride loosely and freely throughout their course except when passing through the cutting field at the guide-plate 117. The gear 107, which drives the cutters, receives its power from the electric motor 52.

There is a waste-way 138 through the bottom part of the rim 116, for the oil or lubricant which flows into the cutter-head and onto the cutters.

In order to facilitate the operation of changing the cutter-bars 125 for others having different teeth 126, the rim 116 may be made in two parts one of which is hinged at 139 to the other. The movable part of the rim 116, which may be termed a gate, is located at the top and indicated by the numeral 140. The gate 140 is secured in closed position by means of a single screw 141. Upon removing the screw 141 the gate 140 may be swung outwardly on the hinge 139 to give access to any block 124 which is positioned at the top of the chanel 122, and enable said block to be swung upwardly on its pivot 133 until it projects out of the channel 122, when the block is withdrawn from the block 123 behind. After the block 124 has been removed the wedge 135 in said block is driven out and the cutter-bar 125 in said block is slipped out. The new cutter-bar is then inserted in the block 124 and secured with the wedge as before, after which said block is swung downwardly over its companion block 123. After this the next following cutter is moved upwardly and to the left into position to have its cutter-bar changed, the change is made, and the operations are repeated until all of the five cutter-bars have been changed. Finally the gate 140 is swung downwardly into closed position, into which position the free terminal of said gate rests on top of the guide-plate 117, and said gate is again secured with the screw 141. In passing, it may be observed that the interlocking parts 131 and 132 prevent the block 124 in each cutter from becoming disconnected from its pivot 133 during the operation of the cutter, but the part 132 can be separated from the part 131 when the gate 140 is open and the uppermost block 124 is turned to project out of the opening thus left in the top of the channel 122.

Skew-bevel teeth may be cut with this machine on a gear blank, by adjusting the cutter-head 51 on its axis to cause the cutter to pass obliquely through the cutting field. This is done by loosening the bolt 69 which clamps the split-ring 68 onto the barrel of the cutter-head 51, and rotating said cutter-head in the ring-bearing 62 to the extent necessary to give to the cutters the required angle as they pass through the cutting field. Then the bolt 69 is retightened.

The machine may be adapted to cut spiral teeth on gear blanks, by substituting, in the cutter-head 51, for the guide-plate 117 a guide-plate 142 the inner guiding edge of which is concave, and substituting for the blocks 124 with their cutter-bars 125 and teeth 126, in each set or cutter, a block 143 having its outer longitudinal edge convex to correspond with the concavity of the guide-plate 142, and its inner longitudinal edge concave, and an arcuate cutter-bar 144 provided with teeth 145 of a corresponding character, all as clearly shown in Figs. 20 and 21. In this case there must be a guide 146 which has an arcuate edge adjacent to the arcuate edge of the guide-plate 142, instead of a straight edge as in the first case. The arcs of the guide-plate 142, blocks 143, that portion of the guide 146 which is adjacent to said guide-plate, cutter-bars 144, and sides of the teeth 145 are concentric. In other respects the cutter-head and cutters are generally similar to the others. Only one cutter is shown in Fig. 20, but provision is made for five as before.

Referring again to the gate 14, it will be seen that the same has on the outside thereof upper and under crown-gear segments 147 and 148, respectively, an annular member or ring 149 having a pair of integral, outwardly-extending, semi-circular supports 150, a segmental-gear 151 at the right-hand side, and a vertical guide for a rack 152.

The crown-gear segments 147 and 148 are fastened by means of screws to the face of the gate 14 at the top and bottom thereof, and each extends an equal distance on either side of the transverse, vertical, central plane of said gate. The gate 14 has an integral, annular flange 156 on the front side, inside of the crown-gear segments, and the ring 149 is placed against said gate within said flange, and there held by means of a ring 157 that is fastened by screws to the face of said flange. The ring 157 projects inwardly over the peripheral edge portion of the ring 149, and the latter is free to rotate in the annular channel formed by the front side of the gate, the flange 156, and the ring 157. The ring 149 has an integral, arcuate lip 158 which is at the right of the supports 150, assuming that said supports are standing vertically. The lip 158 projects outwardly from the ring 149, through and beyond the contiguous portion of the ring 157, and affords an abutment for the inner edge of the segmental-gear 151. The segmental-gear 151 is located outside of the ring 157, with the inner edge of said segmental-gear on the convex side of the lip 158, where said segmental-gear is secured by means of screws 159—159 passing radially through said segmental-gear, at points adjacent to the ends thereof, to be tapped into said lip, as shown in Fig. 5. The crown-gear segments 147 and 148, the annular members or rings, the lip 158, and the segmental-gear 151 are all concentric. The convex edge of the lip 158 is in contact with the inner edge of the ring 157. The ring 149, the lip 158, and the segmental-gear 151 form an arcuate channel or trough in which is a portion of the ring 157, and which moves on said last-named ring. The rack 152 intermeshes with the segmental-gear 151. The chord of the segmental-gear 151 is parallel with the planes of the semicircular supports 150.

The frame or guide, for the rack 152, consists of a vertical plate 160 which is secured by screws to the hinged edge of the gate 14, and provided on the back side adjacent to the front edge of said plate with a flange 161 that extends some distance downwardly from the top of said plate, but not far enough to interfere with the operation by said rack of the segmental-gear 151, a long bar 162 parallel with said flange, the corresponding faces of the flange and bar being in the same plane, upper and under loop arms 163 and 164, respectively, upper and under lugs 165 and 166, respectively, having vertical openings therethrough, and a cover-plate 167—see more particularly Figs. 1, 5, 7, 45, and 46. The loop arm 163 connects the plate 160 and the bar 161 at the top, and the loop arm 164 connects said plate and bar at points below said first-named arm, the parts all being integral. The lug 165 is below the arm 164, connects the plate 160 and the bar 161, and is integral therewith, and the lug 165 is below said first-named lug, connects said plate and bearing, and is integral with the same. These lugs abut the hinge lugs 15. The plate 160 has a wing 168 between the lugs 165 and 166, such wing being parallel with the cover-plate 167. The cover-plate 167 is fastened to the corresponding faces of the flange 161 and bar 162 by means of screws.

The rack 152 reciprocates with its plain longitudinal edge against the bar 162, its sides between the front edge and the wing 168 of the plate 160 (behind the rack) and the cover plate 167 (in front of the rack), and the upper portion of the serrated edge of the rack inside of the flange 161. Below the flange 161 the rack teeth and the segmental-gear teeth intermesh. At the top of the rack 152 is a horizontal arm 169 that moves up and down through the openings in the loop arms 163 and 164 when the rack is reciprocated.

A long, vertical cylinder 93, which is a part of the hydraulic mechanism, is received in the bearings afforded by the lugs 165 and 166. There is a stuffing-box 153 in the upper end of the cylinder 93, and such stuffing-box has an enlarged head 95 on the outside which rests on top of and is supported by the lug 165 and in turn supports said cylinder from said lug. Within the cylinder 93 is a piston 154, as shown in Fig. 41, and a stem or rod 241 from which said piston extends upwardly through the stuffing-box 153 to the rack arm 169, the upper end of said rod being secured to said arm by means of a nut. The lower end of the cylinder is closed with a screw-cap 155. The cylinder 93 is loose in its supporting lugs.

Fluid under pressure is admitted to the cylinder 93 below the piston 154 to actuate the same upwardly, through a port 170 in one side near the bottom of said cylinder, the fluid above said piston then being forced out of said cylinder by way of a pipe 171 which opens through the side near the top of the cylinder (Fig. 41); and fluid under pressure is admitted to said cylinder above said piston to actuate it downwardly, through said pipe, the fluid below the piston then being forced out through said port. When the piston 154 rises it carries with it the rod 241 to which the arm 169 is attached, and said arm is thus raised and moves the rack 152 upwardly; and when said piston descends it causes said rack to descend, through the medium of the intervening parts and members just mentioned. The rack in moving upwardly actuates, through the medium of the segmental-gear 151, the ring 149 to the left, and said rack in moving downwardly actuates, through the same medium as before, said ring in the opposite direction. This movement of the ring 149 imparts to the blank 53 the rolling motion required to give to the teeth being cut the proper form or shape, through the medium of a master-gear segment 173 which intermeshes with the crown-gear segment 148, and other parts and members presently to be described, all of which, except the crown-gear segment, being supported by or from said ring.

Clamped, by means of a strap 174 and bolts 175, to the cylinder 93 below the lug 166 is a bracket 176. Slidingly arranged in the bracket 176 is a vertical rack 177 which is securely fastened to the upper terminal of a piston rod 178. In this connection reference is to be had to Figs. 1, 5, 7, 8, and 9. The rack 177 is supported and guided by a horizontal lug 179 that projects from the outer side of the bracket 176, the plain, longitudinal edge of said rack engaging said lug. Projecting from the same side of the bracket 176, as does the lug 179, is a horizontal stud or screw 180 upon which is mounted a segmental-gear 181, the same being at one end of an arm 182. A block 183 has trunnions (184) by means of which said block is pivotally connected with the bracket 176 on the same side with the screw 180 and the lug 179, said trunnions being at the end of the bracket that is opposite to the end where said lug is located. A brace 185 has one end held in place by the screw 180 and the other end by the outer trunnions 184, the inner trunnion being inserted in the bracket 176. The block 183 is perforated to receive a rod 186. The inner ends of the arm 182 and the rod 186 are pivotally connected at 187 with each other and with the lower end of a rod 188. A spring 189 is interposed on the rod 186 between the head of said road and the block 183.

The rod 178 extends downwardly, from the rack 177, into a distributing-valve casing 190 which has a sleeve 191 that fits the lower part of the cylinder 93 and is secured thereto. The rod 188 extends upwardly, from the pivotally-connected arm 182 and rod 186, through an arm 192 which projects from a horizontal bracket 193. Secured to the rod 188 above and below the arm 192 are two collars 194. These collars are rendered adjustable on the rod 188, by the usual means and in the usual manner, so that the amount of vertical movement of said rod may be changed. There is an arcuate slot 195 in the arm 192, through which slot the rod 188 extends, such slot being struck from the axis of the stem or rod 241. The slot 195 enables the bracket 193 and its arm 192 to be moved, with the gate 14 when the same is opened and closed, without interference on the part of the rod 188, the movement of said bracket then being about the axis of the cylinder 93. The bracket 193 is secured to a vertical plate or bar 196 which is arranged to slide up and down against the outer face of the cover-plate 167, in straps or keepers 197—197 secured to such face by screws. The bracket 193 has another arm 198 which is between the rack-guide parts that carry the wing 168 and the arm 192. The bracket arms 192 and 198 are between the loop arm 164 above and the rack-guide lug 165 below. A rod 199 extends through the arms 198 and 169 and through the loop arms 164 and 163. On the lower terminal of the rod 199 below the arm 198 is a nut 200, and secured to said rod above the arm 169 is a collar 201, such collar being made adjustable by the customary means and in the customary manner on the rod, and for the usual purpose. A spiral spring 202 is placed on the rod 199 above the arm 192, and a similar spring 202 is placed on said rod between the arm 169 and the collar 201.

When the rack 152 is elevated the arm 169 thereof carries with it the rod 199, since said arm then acts through the upper spring 202 on the collar 201, said spring serving as a yielding buffer or shock-absorber to receive the impact of the blow from said arm. In the upward movement thus imparted to the rod 199 said rod carries with it the bracket 193, through the medium of the nut 200 and the arm 198. In rising, the bracket 193, through the medium of its arm 192 and the upper collar 194, takes with it the rod 188, and said rod in turn swings upwardly the arm 182 and rod 186, against the resiliency of the spring 189, into the positions illustrated in the drawings, thereby partially rotating the segmental-gear 181 to the right and driving down the rack 177 and the rod 178. The pivot 187 is now above the horizontal plane in which are located the pivot screw 180 and the trunnions 183, and the arm 182 and the rod 186 are held in the positions indicated by the spring 189, consequently the segmental-gear 181 retains the rack 177 with its rod 178 in the low position. When the rack 152 is moved downwardly the arm 169 descends into contact with the lower spring 202, and, through the yielding resistance offered by said spring, forces the arm 198 and the bracket 193 downwardly, said spring like its companion serving as a shock absorber to receive the impact from said first-named arm. The bracket 193 is carried downwardly with the moving parts, and said bracket, through the medium of its arm 192 and the lower collar 194, takes with it the rod 188, and said rod in turn swings downwardly the arm 182 and rod 186, against the resiliency of the spring 189, thereby partially rotating the segmental-gear 181 to the left and elevating the rack 177 and its rod 178. The arm 182 and the rod 186 are now disposed with the pivot 187 below the horizontal plane in which are located the pivot screw 180 and the trunnions 184, and there held by the spring 189 as before, wherefore the segmental-gear 181 is caused to retain the rack 177 with the rod 178 in its high position. The keepers 197 must be far enough apart to enable the bracket 193, which is attached between said keepers to the slide 196, to be moved up and down as far in each direction as may be necessary. The mechanism last described is both a shift and a lock or detent for the rod 178, and said rod is attached to a main valve 204 in a vertical chamber 205 in the distributing-valve casing 190—Figs. 41 and 44.

It will now be seen that the rack 152, through the medium of the rods 199 and 188, and other intervening parts and members, operates the distributing valve. The rack 152, acting through the ring 149 and the master-gear segment 173, which latter engages the crown-gear segment 148, also produces, or causes to be produced, the rolling motion necessary, in cutting the teeth of the gear blank 53, to give to the sides of said teeth the proper curves in cross section, by the means and in the manner which will next be described, attention being called more particularly to Figs. 11, 12, 22, and 23. In the views just mentioned are also illustrated work-holding means, indexing mechanism, and other features intimately associated with the mechanism which produces the aforesaid rolling motion, and these will be described, before passing to the details of the hydraulic mechanism, which is the last subject, apart from the operation of the generator as a whole, to be considered before the claims in the present case.

The ring 149 forms an annular base, as it were, for the semi-circular supports 150, and said supports spread out at their inner ends to meet and join said ring. The adjacent edges of the semi-circular supports 150 form lips 206—206, and a bearing block 207 is provided which in front has arcuate side parts to fit and slide on said lips behind, and projects forwardly in the longitudinal center to form a wide rib 208 that is received between said lips. The block 207 is secured to the lip-provided or flanged portions of the supports 150 and rendered adjustable thereon, by means of an arcuate clamp 209 and bolts 210 and 211. The arcuate side of the block 207 has a central lug 212 which enters a recess provided to receive it in the inner or back side of the clamp 209. These interengaging parts prevent the block and clamp from becoming relatively displaced even when the bolts 210 are loosened. The back side of the clamp 209 is cut away at the edges to form arcuate side parts to fit and slide on the lips 206, and leave a wide rib 213 similar to the rib 208. The rib 213 is received between the ribs 206, but said rib and the rib 208 are always out of contact with each other. These ribs with the bolts 210 afford adequate means for securing the block 207 to the supports 150, since said ribs hold said block and the clamp 209 against lateral movement relative to said supports, and said bolts when tightened draw said block and clamp into close binding contact with the lips 206. The bolts 210 pass radially, one above the other below, through the longitudinal center of the clamp 209 to be tapped into the block 207, so also does the bolt 211. The bolt 211 is between the bolts 210, and it is tapped through the lug 212 into the block. A spiral spring 214 encircles the bolt 211 between the head of said bolt and the clamp 209. When the bolts 210 are loosened for the purpose of adjusting the block 207 on the supports 150, the spring 214 exerts sufficient pressure on the bolt 211 and the clamp 209 to bind the same to the lips 206 and prevent them from sliding down on said lips, but such pressure is not great enough to prevent the parts from being adjusted when a little force is applied in the required direction. As soon as the bearing block has been adjusted the bolts 210 are again tightened.

The master-gear segment 173 has a split-ring head or hub 215 through which passes the axis of the bearing of the block 207 and of the parts and members supported in such bearing, including the work-holding and -indexing elements, and said block is clamped in place after said segment has been properly engaged with the crown-gear segment 148, and readjusted whenever it is necessary to change said master-gear segment, so that the new master-gear segment shall be retained in proper engagement with said crown-gear segment. The crown-gear segment must be changed every time a bevel-gear having a different pitch angle is to be cut. A shorter master-gear segment is required in order to cut a tooth with a less pitch angle, and a longer segment to cut a tooth with a greater pitch angle.

The bearing of the block 207 at the lower end extends outwardly through the space between the supports 150, and the same is indicated at 216. The axis of the bearing 216 is a radius of the semi-circular supports 150. Within the bearing 216 is a sleeve 217 having a flange 218 at the inner end to bear against the inner end of said bearing. The sleeve 217 is loose in and projects some distance forwardly beyond the bearing 216. Mounted on and keyed at 203 to the sleeve 217, in front of the bearing 216, is a rear clutch-member 219. The clutch-member 219 is held in place on the sleeve 217 by means of a collar 220 screwed on to said sleeve in front of said clutch-member. A front clutch-member 221 is loosely mounted on the sleeve 217 in front of the clutch-member 219. The clutch-member 219 has no sliding movement on the sleeve 217, but the clutch-member 221 may slide on said sleeve and rotate thereon independently thereof. At the front end of the clutch-member 221 is a part 242 that is received in the split-ring hub 215 of the master-gear segment 173, and to which said head is rigidly attached by means of a horizontal bolt 222. The bolt 222 connects the ends of the hub 215 and clamps said hub to the part 242. There is a space left between the ends of the hub 215, to receive a finger 223. The finger 223 extends rearwardly from a split band 224 mounted on a friction collar 225 that in turn is mounted partly on the sleeve 217, at the outer end thereof, and partly on a nut 226. The band 224 is arranged with its ends at the bottom, and such ends are connected by means of a screw 227 which when tightened draws said band tightly into contact with the friction collar 225. A spiral spring 228 is interposed between the clutch-member 221 and the collar 225. The nut 226 has a hollow part which extends rearwardly into the sleeve 217, the outer terminal portion of said sleeve being enlarged on the inside to receive such part. A hollow shaft or spindle 229 is received in the sleeve 217. The spindle 229 has a flange 230 at the inner end behind the flange 218, and said spindle at the front terminal is tapped into the aforesaid hollow part of the nut 226. A filling or spacing collar 231 is mounted on the spindle 229 between the flange 230 and the adjacent end of the sleeve 217, and these parts are pinned together at 232. When the nut 226 is tightened it bears on the outer end of the sleeve 217, or on an interposed gasket 233, and draws the spindle 229 forwardly with the collar 231 hard against the rear end of said sleeve, and the flange 230 hard against said collar. These parts and members are thus rigidly held together and must all rotate together, and held and caused to rotate with them is the blank 53, because said blank is secured to the aforesaid parts and members by means of an arbor 234, a pin 235, a draw-rod 236, and a hand-wheel 237.

The arbor 234 has a head 238 at the rear end, and said arbor passes forwardly through the blank 53 into the spindle 229. The draw-rod 236 passes rearwardly through the nut 226 into the spindle 229, and has its rear terminal tapped into the forward terminal of the arbor 234. The outer terminal portion of the spindle 236 is screw-threaded to receive the hand-wheel 237, and a ball-bearing 239 is provided between the head of the nut 226 and the hub of said hand-wheel. Upon tightening the hand-wheel against the nut, the draw-rod 236 and the arbor 234 are drawn outwardly, and, acting through the head 238, force the hub of the blank 53 hard against the inner end of the spindle 229. By this means and with the aid of the pin 225 the blank 53 is held in place in the cutting field, and while being cut, rolled for the purpose of producing the curved contour of the teeth, and intermittently partially rotated for the purpose of indexing.

There is an opening 240 in the gate 14 behind the opening in the ring 149, and in these openings is the cutting field wherein are located the blank 53 and the cutter during the cutting operation.

When the ring 149 is partially rotated in one direction by the rack 152, everything supported by the block 207 is moved with said ring in the same direction, and the master-gear segment 173 is actuated, by reason of its engagement with the stationary crown-gear segment 148, and imparts a partial revolution or a rolling motion to the blank 53, through the medium of the clutch members 221 and 219 which are locked together at the time, the sleeve 217, the hollow spindle 229, and the arbor 234 which is now locked to said spindle. This motion or partial revolution is the rolling motion hereinbefore referred to, and is of an extent and character to give to one side of a tooth being cut the required curve. When the ring 149 is partially rotated by its rack in the opposite direction, everything carried by the block 209 is moved with said ring in said direction, the master-gear segment 173 is actuated by the same means as before, but in the opposite direction, and again imparts a partial revolution or a rolling motion to the blank 53, through the medium of the intervening parts and members before mentioned. This time the rolling motion is, of course, in the direction opposite to that imparted the first time. Thus the blank 53 is rolled into and out of engagement with the cutters, or with their teeth 126, from one direction, to form or shape one side of a slot in the blank between two adjacent teeth, and is rolled into and out of engagement with said teeth, from the other direction, to form or shape the other side of said slot. The friction collar 225, being under pressure from the spring 228, and the finger 223 on the band 224 which is fast to said collar, tend to retard the movement and steady the action of the hub 221, and thus prevents lost motion or back-lash. It is while the cutter teeth are out of the slot in the blank that the cutter-head is rocked and partially rotated, as hereinbefore explained, and that the blank is indexed, as hereinafter explained. The rolling motion is due to the construction that provides rigid connections between the master-gear segment hub 215 and the gear blank 53, and the tooth engagement between the master-gear segment 173 and the crown-gear segment 148, inasmuch as the part 242, upon which said hub is mounted and to which it is rigidly secured, describes an arc in or from one direction or the other, when the ring 149 is partially rotated, and at the same time is caused to rotate slightly by said segment as the same rocks on the crown-gear segment 148. The master-gear segment, in rocking in one direction on the crown-gear segment, partially rotates its hub in the opposite direction to that in which the part 242 is moving, and thus causes the work to be partially rotated, the amount of movement being sufficient to roll the work into and out of engagement with the cutter teeth.

The hub 215, of the master-gear segment 173, can be slipped forwardly off of the clutch-member part or projection 242, after unscrewing and removing the hand-wheel 237 from the draw-rod 236, unscrewing and removing the nut 226 and with it the collar 225 from the hollow spindle 229, and loosening the bolt 222. Then, when the hub of a new master-gear segment is placed on the projection 242, the aforesaid parts in the reverse order are returned to place. Different master-gear segments are necessary in order that the machine may cut bevel-gears having different pitch angles, as previously noted.

The work-holding means include the sleeve 217, the hollow spindle 229, the spacing collar 231, the arbor 234, the draw-rod 236, and the hand-wheel 237, which have already been quite fully described. The draw-rod 236 has a square head 243 at the outer end to receive a wrench, and when all of the teeth have been cut on the blank 53, the hand-wheel 237 is loosened, the wrench is applied to said head and said draw-rod is rotated in the direction to free it from the arbor 234. The arbor 234 is then withdrawn from the hollow spindle 229, the bevel-gear which has just been cut is removed from said arbor, another blank is placed on the arbor, the latter is reinserted in said spindle, the draw-rod is again screwed into the arbor, and the hand-wheel 237 is retightened. A check-nut 243 for the hand-wheel 237 may be employed, and if so the same is mounted on the draw-rod 236 in front of the hand-wheel hub. The check-nut 243 is tightened against the hand-wheel hub to lock the same after the hand-wheel is tightened, and said check-nut must be loosened before said hand-wheel can be loosened. Each blank, if roughly slotted before being placed in this machine, has an opening 244 in the hub of said blank and parallel with the axis thereof to receive the protruding rear terminal of the pin 235, which pin positions said blank so that the slots already cut therein shall be properly located relative to the cutter, and insures the location of the blanks always in the position required for rolling and indexing. Usually, in practice, one blank is mounted on the arbor 234, with the pin 235 in the opening 244 in the hub portion of said blank, and completely cut, and then subsequent blanks are roughed out before being cut and finished in the present machine, care being taken to have the opening 244 properly located in the hub portion of each of these blanks when the same is placed in said machine.

The spacing collar 231 locates the blank 53 the proper distance from the inner end of the sleeve 217, and must be changed for a narrower or wider collar when the axis of the blank is longer or shorter. The change is made while the parts are sufficiently disassembled to permit the hollow spindle 234 to be withdrawn from the sleeve 217. The engaging portions of the draw-rod 236 and arbor 234 are of sufficient length to accommodate said arbor to different sizes of filling collars and the blanks for which said collars are provided.

Passing to the indexing mechanism the same will be found to be quite fully illustrated in the general views, but more particularly and in detail in Figs. 22 to 40, inclusive. This mechanism comprises, with the work-holding elements and the clutch-members 219 and 221 mounted on the sleeve 217, which sleeve is one of said elements, an arm 245 having a ring support or hub 246 which is mounted on the bearing 116, against a shoulder which is a short distance back from the front end of said bearing, and is secured to the latter by means of screws, said arm being a supporting and guiding member for a rack 247, a guard band 248 mounted on the rear clutch-member 219 and bolted at 249 to said hub, a segmental-gear 250 with which said rack intermeshes, and which is provided with pawls 251 and 252, the latter being forward and to the right of the former, and front and back cam-rings 253 and 254, respectively.

The rear clutch-member 219, which is fixedly connected with and has no movement independently of the sleeve 217, as previously stated, is made in two parts, in the present example, and such parts are held together by means of pins 255 and bolts, one of the latter appearing at 256 in Fig. 24. In the periphery of the clutch-member 219, inside of the band 248, is an annular groove 257, and said band is held in place on said clutch member by means of one or more ordinary screws, as 258, and a thumb-screw 259 that are tapped into said band and extend into said groove. The screw 258 and the thumb-screw 259 serve to retain the band 248 in place on the clutch-member 219, and to guide it thereon when adjusted, and said thumb-screw is further utilized to tighten the parts after adjustment, and to take up wear. The band 248 has a lug 260 that extends rearwardly from the back edge thereof onto the hub 246, and in said lug is a longitudinal slot 261. The bolt 249 passes through the slot 261 into threaded engagement with the hub 246. In the front edge of the band 248, across from the lug 260, is a slot 262. Upon loosening the bolt 249, the band 248 can be adjusted on the clutch member 219 in such a manner as to locate the slot 262 higher or lower. the amount of such adjustment being limited only by the length of the slot 261. After such adjustment the bolt 249 is again tightened. Ratchet-teeth 263 are formed on the periphery of the clutch-member 219 in front of the grooved part thereof, a portion of such ratchet-teeth being exposed through the slot 262. The front part or section of the clutch-member 219 is designated by the numeral 264, and on the front edge of such section are teeth 265, with which teeth are adapted to intermesh similar teeth 265, on the back edge of the forward clutch-member 221. During the cutting operation the two sets of teeth 265 are in engagement with each other, and the work is thereby brought under the control of the master-gear segment 173, but they must be disengaged during the indexing operation. The arm 245 extends to the right from the hub 246, and then forwardly, and has therein a slot 320 to receive the rack 247, said rack being supported in a generally upright position. On the side of the hub 246 that is opposite to the arm 245 is a thickened part that supports the band lug 260 and receives the bolt 249.

The cam-ring 253 is loosely mounted on the section 264 of the clutch-member 219, that portion of said section upon which said cam-ring is mounted being reduced in diameter. On the periphery of the cam-ring 253 are ratchet teeth 267, and on the front edge of said cam-ring are eight cam teeth 268. On the rear edge of the cam-ring 254 are also eight cam teeth 268. The cam-ring 254 fits within an annular recess in the front side of the clutch-member 221, and is therein secured by means of a screw 269 that passes radially through one of the teeth 268 on said cam-ring and is tapped into said clutch member. The cam teeth 268 on the two cam-rings and the teeth 265 on the two clutch-members are so proportioned that, when said cam teeth are fully interengaged, said clutch-member teeth are also interengaged, and, when said cam teeth are disposed with their high parts in engagement, said clutch-member teeth are entirely disengaged. The spring 228, tending constantly as it does to force the clutch-member 221 rearwardly, thereby causes the cam-ring 254 always to be in contact with the cam-ring 253, but during rotation of the rear cam-ring the front cam-ring is forced forwardly, against the resiliency of said spring, as the high parts of the cam teeth 268 on said rear cam-ring ride onto the high parts of the cam teeth 268 on said front cam-ring. The front cam-ring is permitted to move rearwardly, under the force of the spring 228, when the high parts of the teeth 268 on the rear cam-ring enter the recesses between the teeth 268 on said front cam-ring. These actions on the part of the clutch elements occur, and the clutch-members are unlocked and locked (through the medium of the teeth 265), at each eighth part of a revolution of the cam-ring 253. It is while the clutch-members are unlocked by the disengagement of their teeth 265 in the manner just explained. that the work is indexed. The cam-ring 253 is intermittently rotated by means of the pawl 252 which engages the ratchet-teeth 267, and the indexing operation is brought about by the action of the pawl 251 on the clutch-member ratchet-teeth 263. The high parts of the cam teeth 268 are of sufficient length to permit the operations just explained to take place and also to allow for or accommodate themselves to whatever adjustment of the parts may be made to cause the indexing mechanism to operate sooner or later.

The pawl 251 is pivotally connected at 270 with a lug 271 that projects outwardly from the segmental-gear 250, and the pawl 252 is pivotally connected at 272 with a lug 273 that also projects outwardly from said segmental-gear, said first-named lug being behind the plane and in advance (in the direction of rotation of the segmental-gear) of said second-named lug. The free end of the pawl 251 is forward, in the direction of rotation of the segmental-gear 250, and such end rides on the band 248 and reaches the clutch-member ratchet-teeth 263 through the slot 262 in said band. The free end of the pawl 252 is also forward, in the direction of rotation of the segmental-gear 250, and such end reaches the cam-ring ratchet-teeth 267 through a slot 274 (Fig. 22) in said segmental-gear. Springs 275 and 276 are fastened to the periphery of the segmental-gear 250 and respectively arranged to bear on the pawls 251 and 252 in such a manner as to force the free ends of said pawls inwardly.

By adjusting the band 248 to the left, the amount of rotation imparted to the clutch-member 219 by the pawl 251 is less, because said pawl does not so soon slip through the slot 262 to engage the ratchet-teeth 263, and, by adjusting said band to the right, the amount of rotation imparted to said clutch-member by said pawl is greater, because said pawl sooner slips through said slot to engage said teeth. Thus the amount of movement imparted to the blank 53 in the indexing operation is regulated.

Rising from the top of the rack 247 is a rod 277. This rod extends through a cylinder 278 having stuffing-boxes 279 and 280 in the top and bottom ends, respectively, thereof. Secured to the rod 277 in the cylinder 278 is a piston 281. Fluid under pressure is admitted to the cylinder 278 through one side thereof, intermittently above and below the piston 281, at 282—282. The cylinder 278, with its piston and the rod therefor, is a part of the hydraulic mechanism. This cylinder is supported from the clamp 207 by means of an integral bracket 283 that extends forwardly from the front side of said clamp, adjacent to the right-hand edge and at and adjacent to the top thereof.

When the fluid is admitted under pressure to the cylinder 278 through the lower port 282, the piston 281 is caused to rise in said cylinder, forcing the fluid above the same out through the upper port 282, and the rack 247 is elevated through the medium of the rod 277; and, when the fluid is admitted under pressure to said cylinder through said upper port, said piston is actuated downwardly, carrying with it said rod and rack, and forcing the fluid in the cylinder below the piston out through the lower port 282. When the rack 247 ascends, it imparts a partial revolution to the left to the segmental-gear 250, and the pawls 251 and 252 are carried in the same direction. The free end of the pawl 252 being in engagement with the ratchet-teeth 267 of the cam-ring 253, causes said cam-ring to be partially rotated to the left, with the result that the cam teeth 268 of said ring, acting against the cam teeth 268 of the cam-ring 254, force said last-named cam-ring and the clutch-member 221 forward, against the resiliency of the spring 228, and thereby cause the teeth 265 on said clutch-member to be disengaged from the teeth 265 on the clutch-member 219, it being remembered that the cam-ring 254 is attached to said first-named clutch-member. After the front clutch-member has thus been disengaged from the rear clutch-member, and while the high parts of the two sets of cam teeth 268 are in contact with each other, the free end of the pawl 251 slips into the opening 262 in the guard band 248, engages the ratchet-teeth 263 on the clutch-member 219, and imparts to said clutch-member a partial revolution to the left. Since the clutch-member 219 is secured to the sleeve 217, when said clutch-member has imparted thereto a partial revolution, it imparts a partial rotation to said sleeve and the bear blank 53 which is fixedly connected therewith. The amount of movement thus imparted to the blank 53 is equal to the distance between two tooth slots in said blank, consequently the latter is indexed or positioned in readiness to have the next succeeding slot cut therein. At the instant the blank 53 has been relocated for the purpose of having the next succeeding slot cut therein, the high parts of the cam teeth 268 on the cam-ring 253 clear the high parts of the cam teeth 268 on the cam-ring 254, and the spring 228 forces the clutch-member 221 rearwardly until the teeth 265 on said clutch-member engage or interlock with the teeth 265 on the clutch-member 219, whereby further rotary motion of the work-holding members ceases. The rack 247 is now caused to descend and impart to the segmental-gear 250 a partial revolution to the right, the amount of such movement being equal to the amount of movement in the opposite direction, and the pawl 251 is reset in readiness to cause the work to be indexed a second time, or when said rack is again elevated. The segmental-gear 250, in its partial rotation to the right, carries with it the pawls 251 and 252, the latter clicking over the ratchet-teeth 267 on the cam-ring 253 without affecting the same, and the pawl 251 clicking ineffectually over the ratchet-teeth 263 on the clutch-member 219, and riding out of the slot 262 onto the outside of the band 248. The indexing operation is repeated, in the manner just explained, until all of the teeth have been cut on the blank 53.

The hub 215, of the master-gear segment 173, moves forwardly and rearwardly with the clutch-member 221, but such movement is not sufficient to disengage the teeth of said segment from the teeth of the crown-gear segment 148.

The rack 247 and the segmental-gear 250 are so set and timed that, at each cycle of the machine, one eighth of a revolution is imparted to said segmental-gear.

By changing the clutch-member 219 having a given number of ratchet-teeth 263 for a clutch-member having a greater or less number of ratchet-teeth, gears having a greater or less number of teeth may be indexed therewith. For example: A clutch-member having sixty-four teeth could be adjusted to cut thirty-two, sixteen, or eight gear teeth, and a clutch member having ninety-six ratchet teeth could be adjusted to cut forty-eight, twenty-four, or twelve gear teeth. These ratios might be continued indefinitely, but in any given case can be increased by increasing the amount of rotation of the rotary parts of the clutch mechanism, and decreased by decreasing the amount of such rotation. It is preferred, however, to limit the aforesaid rotation to one-eighth of a revolution.

The hydraulic mechanism of this machine, in addition to the distributing-valve and other cylinders and elements hereinbefore described, consists of the elements described below and which are illustrated in detail in Figs. 41, 43, and 44.

The oil or other fluid, which is the operating medium for the hydraulic elements that actuate the distributing valve, impart oscillatory and rotative motions to the cutter-head, cause the indexing mechanism to be operated, and produce the rolling motion of the work, is contained in a tank 284. A pump 285 is supported adjacent to the tank 284, and said pump has a shaft 286 upon which is secured a pulley 287 driven by means of a belt 288 from any suitable source of power. Upper and under pipes 289 and 290, respectively, are connected by short, vertical pipes 291 with the top and bottom, respectively, of the pump 286. In the lines of pipes now being described, the necessary T's and elbows are employed, but these will not be designated with numerals. A pipe 292 extends downwardly from the pipe 290 into the tank 284. A vertical pipe 293 connects the pipes 289 and 290. The pipe 290 is provided with a valve 294 which is located between the points of connection of the pipe 292 and the pipe 293 with said first-named pipe. A pipe 295 extends downwardly from a pressure-governing valve 296 that is attached to the pipe 289 at the end opposite to that where said last-named pipe connects with the upper pipe 291. The pipe 289, between the valve 296 and the point of connection with said pipe of the pipe 293, is provided with a pressure gauge 297. In one side of the distributing-valve casing 190 is an inlet or intake port 298 which opens into the valve chamber 205, and above and below said port are two exhaust ports 299 which also open into said chamber. The main valve 204 operates between the ports 299 without closing either of the same, and when said valve is in its high position it is above the port 298, and when said valve is in its low position it is below said last-named port. Therefore, when the valve 204 is elevated, the intake port 298 and the lower exhaust port 299 can communicate through the chamber 205, but said intake port can not communicate with the upper exhaust port 299; and, when said valve is in its low position, said intake port can communicate with said upper exhaust port through said chamber, but can not communicate with said lower exhaust port. A horizontal pipe 300 extends rearwardly from the casing 190, and is connected at its forward end with the inlet port 298. A flexible pipe 301 connects the pipe 300 with the upper pipe 291. The pipe 300 is loosely supported in a strap 302 which is fastened to the right-hand side of the bed 2. The pipe 300, by being thus supported, and having a flexible connection with the upper pipe 291 through the medium of the pipe 301, is free to move back and forth and laterally with the casing 190 when the gate 14 is opened and closed, since said casing is secured to the cylinder 93, and the latter is carried by said gate. This movement is, of course, comparatively slight, since the cylinder 93 is loosely supported in and by the lugs 165 and 166. The casing 190 is provided with an exhaust chamber 303, and said chamber opens into the valve chamber 205 through two ports 304 on opposite sides of or above and below the valve 204. A horizontal pipe 305 communicates at its front end with the exhaust chamber 303, and a vertical pipe 306 is connected with said first-named pipe at the rear end thereof. The pipe 306 extends downwardly into the tank 284. There is a port 307 in the side of the casing 190 opposite to that in which are located the ports 298 and 299, and said first-named port opens at one end into the chamber 209, and has connected with the other end a pipe 321. The pipe 321 rises from the casing 190 and is connected at the upper end with the short pipe 171 which opens into the cylinder 93 above the piston 154. The pipe 321 is provided with a speed-control valve 308. A horizontal pipe 309 has one end in communication with the upper port 299 in the casing 190, and has connected with the other end the lower terminal of a flexible pipe 310. The flexible pipe 310 at its upper terminal is connected with the pipe 91 that rises from the twin-cylinder casing 75 above the cutter-head 51. A horizontal pipe 311 has one end in communication with the lower port 299 in the casing 190, and has connected with the other end the lower end of a flexible pipe 312. The upper end of the flexible pipe 312 is connected with the pipe 90 that rises from the aforesaid twin-cylinder casing. A flexible pipe 313 has its upper terminal connected with the pipe 90, and its lower terminal connected with the indexing cylinder 278 in position to communicate through the lower port 282 with the interior of said casing; and a flexible pipe 314 has its upper terminal connected with the pipe 91, and its lower terminal connected with said cylinder in position to open through the upper port 282 into the interior thereof.

That portion of the stem or rod 178 which is in the chamber 205, at points above and below the valve 204, is reduced in size to form shoulders 315—315, and loosely mounted on the reduced parts of said rod are auxiliary valves 316—316. In the upper and lower ends of the chamber 205 are stuffing-boxes 317—317 through which the rod 178 extends, and which move up and down with said rod, sliding in the ends of the casing. The stuffing-boxes 217 are secured to the rod 178. A spiral spring 318 encircles the rod 178 between the lower valve 316 and the lower stuffing-box 317, and a similar spring encircles said stem between the upper valve 316 and the upper stuffing-box 317. Normally the springs 318 retain the valves 316 in contact with the shoulders 315. There is a port 319 in the casing 190 which opens at one end into the chamber 205, and at the other end through the port 170 into the interior of the cylinder 93.

When the pump 285 is in operation, fluid from the tank 284 is drawn up through the pipe 292 and the lower pipe 291 into said pump, and said fluid is forced out of said pump through the upper pipe 291. If the valve 294 be opened, as is done whenever it is desired to stop the operation of the machine without stopping the pump, the fluid passes from said pump through the upper pipe 291, the pipes 289, 293, and 290, and the lower pipe 291, back to the pump, said fluid going through said valve on the way. If, however, the valve 294 be left closed, the pump forces the oil through the upper pipe 291 into the pipes 289 and 301. The valve 296 is set to regulate the pressure of the fluid in the system to the required degree, as shown on the indicator 297, any excess fluid escaping through said valve and passing through the pipe 295 back into the tank 284.

Fluid from the pipe 301 passes through the pipe 300 and the port 298 in the casing 190 into the valve chamber 205. If the valve 204 be in its elevated position, the fluid thus introduced into the pipe 311, passes from said pipe through the pipes 312 and 90 into the twin-cylinder casing 75, and causes the cutter-head 51 to be rocked on the shaft 60 to the left, and to be partially rotated on its axis in the opposite direction. The exhaust from the twin-cylinder casing 75 returns through the pipes 91, 310, and 309 to the valve chamber 205 by way of the upper port 299, and escapes from said chamber through the upper port 204 into the exhaust chamber 303, and from the latter, through the pipes 305 and 306 to the tank 284. At the same time the fluid passes from the pipe 90 through the pipe 313 to the index cylinder 278, entering said cylinder through the lower port 282, and drives upwardly the piston 281 therein to index the work. The upward movement of the piston 281 forces the exhaust through the upper port 282 into the pipe 314, and through such pipe and the pipes 91 and 310 back to the tank, with the exhaust from the twin-cylinder casing 75. Then, as the pressure accumulates in the valve chamber 205 below the valve 204, the lower auxiliary valve 216 is forced downwardly, against the resiliency of the contacting spring 318 and away from the shoulder 215 with which said valve was in contact, and opens the port 219, thus enabling the fluid to be forced from the chamber 205 through said port and the port 170 into the cylinder 93 below the piston 154, with the result that said piston is carried upwardly and the segmental-gear 151 operated for the purpose of rolling the gear blank 52 into and out of engagement with the cutter teeth. As the blank rolls into engagement with the cutter teeth, the latter cut and form the left-hand side of a tooth slot in said blank. The exhaust from the cylinder 93 above the piston 154 is forced out through the pipes 171 into the pipe 321, and from the latter into the valve chamber 205 through the port 307, and from said chamber through the upper port 204 into the exhaust chamber 303, and thence through the pipes 305 and 306 into the tank. The fluid on the way passes through the valve 308 which is set to control the flow of the fluid to and from the cylinder 93, and thus govern the speed at which the work-rolling mechanism is operated. The lower auxiliary valve 316 at this time also closes the lower exhaust port 304.

The rod 241, in its upward movement with the piston 154, causes the rod 188, through the medium of the intervening mechanism, to be elevated, and said last-named rod, acting through the arm 182, the segmental-gear 181, and the rack 177, causes the valve rod 178 to be depressed, and the valve 204 to be moved from a position above the port 298 to a position below said port. The lower spring 318 now acts to force the lower auxiliary valve 315 against its shoulder 316, thus closing the port 319 and opening the lower port 304. The fluid now entering the valve chamber 205, by way of the port 298, passes through the upper port 299 into the pipe 309, and from said pipe through the pipes 309, 310, and 91 to the twin-cylinder casing 75, at the end opposite to that where the fluid entered the first time, and causes the cutter-head 51 to be rocked to the right and to be partially rotated to the left. The exhaust from the casing 75 is returned through the pipes 90, 312, and 311 to the chamber 205 by way of the lower port 299, and passes through the lower exhaust port 204 into the exhaust chamber 303, from whence it is returned through the pipes 305 and 306 to the tank. At the same time the fluid passes through the pipes 91 and 314 to the index cylinder 278, which it enters through the upper port 282 and forces the piston 281 downwardly. The exhaust from the cylinder 278 below the piston 281 is expelled through the lower port 282 into the pipes 313 and 90 into the casing 75, to be returned to the tank with the exhaust from said casing. Again, as in the first case, after the cutter-head and index pistons have been operated, the accumulating pressure in the chamber 205, this time above the main valve 204, overcomes the resistance offered by the upper spring 318, and the upper auxiliary valve 316 is elevated to close the upper exhaust port 304 and open the port 307, when the fluid from said chamber above said main valve passes through said port 307 into the pipe 321, and from said pipe through the pipe 171 into the cylinder 93 above the piston 154. The piston 154 is thus forced downwardly in the cylinder 93, and the exhaust from said cylinder escapes through the ports 170 and 319 into the chamber 305, which port 319 and the lower exhaust port 304 are now open, (as were the ports 307 and the upper port 304 when the valve 204 was in its elevated position), passes from said chamber through the lower port 304 into the exhaust chamber 303, and from that escapes through the pipes 305 and 306 to the tank.

The rod 241 in its downward movement with the piston 154, causes the rod 188, through the medium of the intervening mechanism, to be carried downward, and said last-named rod, acting through the arm 182, the segmental-gear 181, and the rack 177, causes the valve rod 178 to be carried upward, the valve 204 to be moved from a position below the port 298 to a position above said port. The upper spring 318 now acts to force the upper auxiliary valve 315 against its shoulder 316, thus closing the port 307 and opening the upper port 304. The fluid is now caused to take the directions and produce the results herein first described.

From the foregoing it is seen that the cutter-head controlling pistons and the indexing-operating piston act simultaneously, or approximately so, and that such action is followed by the action of the piston which imparts the rolling motion to the gear blank.

The gear blank is rolled into engagement with the cutter teeth on the left-hand side of a tooth slot in said blank, when the segmental-gear 151 is actuated to the left, and the axis of the work-holding and -indexing mechanisms is swung from its extreme left-hand to its intermediate position, and said blank continues to roll until it is entirely clear of said teeth, as said segmental-gear continues to rotate, and said axis continues to move to the right and until the axis reaches the right-hand limit of its path, having described a conical section. The blank is now clear of the cutter teeth, and next the cutter-head is caused to swing to the right and partially to rotate to the left, and the index is reset. Then the segmental-gear 15 is actuated to the right, and the aforesaid axis is swung to the left until it has returned to the extreme left-hand limit of its travel, during which movement the gear blank is rolled into engagement again with the cutter teeth, the latter cut and form the right-hand side of the aforesaid slot, and said blank is rolled out of engagement with and clear of said teeth. Following the last operation, the cutter-head is again rocked and partially rotated, but this time in opposite directions, respectively, to those previously imparted to said cutter-head, and the blank is indexed.

When the piston 154 ascends the main valve 204 is caused to be moved upwardly, and, when said piston descends, said valve is caused to descend.

The operation of the generator as a whole is described as follows, it being assumed that the cutter-head 51 is equipped with cutters suitable for cutting the teeth on the bevel-gear blank 53, and that said blank is in place on the arbor 234:

The carriage is adjusted between the side pieces 5 of the bed 2, by means of the screw 42, to determine the depth of the cut made by the cutter teeth 126 in the blank 53; the carriage 41 is adjusted on the pivot 40, by means of the screw 49, to tilt the cutter-head 51 until said teeth are at the proper angle, when the cutters pass down between the guide-plate 117 and the guide 115, to cut the slots in said blank at the proper angle; said carriage and carrier are secured by means of the screw 45; the stop screws 72 are adjusted to limit the oscillatory movement of said cutter-head, whereby said cutters, after they pass between said guide-plate and said guide, are intermittently carried from one side to the other of the slot being cut, to compensate for the difference between the width of a tooth on the blank and the width of said slot; the screws 88 are adjusted to determine the proper amount of intermittent partial rotation of said cutter-head, whereby the cutters are set to the proper tooth angle as they pass through the cutting field, acting first on one side and then on the other side of the slot; and the hand-wheel 37 is actuated to raise or lower the gate 14 to whatever extent may be necessary in order to locate the face of the blank at the bottom in the same horizontal plane with the horizontal center of said cutting field. The master-gear segment 173 is already in place, and the block 209 has been adjusted on the supports 150 to whatever extent was necessary to accommodate said segment and position the blank 53 at the proper pitch angle. After the adjustments have been made, and with the index mechanism equipped and set to do the required work in this particular case, the machine is ready to be set in motion. The electric current is, therefore, turned on to start the motor 51, and the power is applied to start the pump 285. The motor and pump run constantly while the generator is in operation. And, as a final preliminary the gate 14 is closed and locked.

It is understood, of course, that the tooth angle is the angle on the pitch-cone radius, or the angle which radiates from the apex of said cone, and that the cutting angle, meaning the depth of the tooth inside of the pitch line, also radiates from said apex. It is understood, furthermore, that the partial rotation of the cutter-head 51 is for the purpose of causing the cutter to conform to the angle of each side of a tooth slot, which slot is deeper at the outer end than it is at the inner end, and, therefore, necessitates the tilting of the cutter to conform to such difference.

The power from the motor 52 is transmitted to the cutters, through the intervening driving parts and members, and said cutters are caused to travel on a plane in a circuitous path in a direction which is contrary-clockwise or to the left. As each cutter passes down through the space between the guide-plate 117 and the guide 115, the teeth 126 of such cutter remove the stock from the gear blank 53, the lower portion of which is in the path of said teeth. The stock is removed first from one side and then from the other side of a slot already roughed out in the blank, or else cut an initial slot therein and widen the same to the required extent, this result being obtained by rocking the cutter-head 51 on the shaft 60 and partially rotating said cutter-head on its axis, while said blank is out of contact with the teeth 126. The teeth 126 cut the full depth of the slot. After the cutters have cut a slot in the blank on one side to the required depth, at the required angle, and of the required shape, the position of the cutter-head 51 is changed and said teeth cut the other side of said slot to the required depth, at the required angle, and of the required shape. Naturally the master-gear segment 173 must be of the right proportions to roll the blank 53 entirely clear of the cutter teeth 126, each time said segment operates, so that the cutters are left free to be tilted without interference from the blank, and the latter is free to be indexed without contacting with said teeth. The indexing movement of the blank 53 is to the left. When, through the medium of the master-gear segment 173, the blank 53 is first rolled into and out of engagement with the cutter teeth 126, said teeth cut the left-hand side of a slot, or at least it is so assumed for the purposes of this description, and then, after the cutter-head 51 has been rocked on the pivot 60 and partially rotated on the axis of said cutter-head, said blank is a second time rolled into and out of engagement with said teeth, and the other side of said slot is cut.

During the cycle of cutting opposite sides of a tooth on the blank 53, first the right-hand side and then the left-hand side, the main distributing valve 204 is moved down, from the position which it occupies in Fig. 44, to open the way from the port 298 through the valve chamber 205 to the upper port 299, when the cutter-head 51 is rocked to the right and partially rotated to the left, and the index is reset; and the pressure in said chamber increases and causes the upper auxiliary valve 315 to rise in said chamber and thereby open the port 307, when the piston 154 is driven downwardly and with it the rack 152, and the motion necessary to cause the work-holding mechanism to roll the blank 53 with the left-hand side of the tooth (the same being the right-hand side of the first slot) into engagement with the cutter teeth 126. After the gear blank clears the cutter teeth, the rod 178 is elevated and carries with it the valve 240, said valve being moved again into the position shown in Fig. 44, in which position said valve causes the fluid to pass from the port 298 through the chamber 205 into the lower port 299. The pressure in the chamber 205 then increases until the lower auxiliary valve 216 is forced downwardly to open the port 319. Before the port 319 is opened, however, the fluid from the lower port 299 causes the cutter-head 51 to be rocked to the left and partially rotated to the right, thereby positioning the cutters in readiness to act on the left-hand side of the next succeeding slot in the blank, and causes the work to be indexed. At this time the piston 281 rises in the cylinder 278 and, through the medium of the rod 277 and the rack 247, imparts a partial revolution to the left to the segmental-gear 250, thereby producing the required indexing operation in the manner hereinbefore explained. When the port 319 is opened, the fluid causes the blank to be rolled with the right-hand side of the tooth, which is the left-hand side of the next succeeding slot, into engagement with the cutter teeth 226. By this time the piston 54 arrives at the upper end of its travel, the main distributing valve 315 is again actuated downwardly, and the course of the fluid is again changed, with the result that the operations previously described are repeated. While the cutter-head 51 is being rocked to the right and partially rotated to the left, the fluid passes through the pipe 314 to the cylinder 278, and causes the piston 281 to descend, thereby bringing about the resetting of the index mechanism. Thus one tooth slot and one tooth after another are cut in and on the blank 53 until said blank has been completely transformed into a bevel-gear.

After all of the teeth have been cut on the blank 53, the door 14 is unlocked and swung open, and the arbor 234 is released and removed from the hollow shaft 229, and from the finished gear, then said arbor is passed through another blank, reinserted in said shaft, and reengaged by the draw-rod 236, care being taken that the opening or passage 244 in the hub of said blank receives therein the protruding terminal of the locating pin 235, and finally said blank is drawn tightly into contact with the inner end of said shaft, by means of the hand-wheel 237. The gate 14 is now closed, and the new blank is cut in the same manner as was the first blank.

The details of the operations and movements of the several mechanisms of the machine have been touched upon but briefly in the foregoing description of the operation of the machine as a whole, because they have previously been so fully described, and will from such description be clearly understood.

With the lower crown-gear segment 148 in use the teeth on the blank are cut from the inside to the outside of said blank. If the upper crown-gear segment 147 were employed, the teeth on the blank would be cut from the outside to the inside. In cutting spiral toothed gears, the bottom segment 148 is used for the teeth on one gear blank, and the upper segment 147 is used for the teeth on the other gear blank.

What I claim as my invention, and desire to secure by Letters Patent, is—

1. In a bevel-gear generator, an oscillatory cutter-head, a cutter having a lateral cutting part, means to move said cutter in an unsymmetrical circuitous path in a plane in said cutter-head, the portion of said path through which said cutter moves during the actual cutting operation being substantially straight, and automatic means intermittently to oscillate said cutter-head to make up the difference between the width of said cutting part and that of a slot to be cut thereby.

2. In a bevel-gear generator, a cutter having a lateral cutting part, means to move said cutter in an unsymmetrical circuitous path in a plane, the portion of said path through which said cutter moves during the actual cutting operation being substantially straight, means to oscillate said cutter to make up the difference between the width of said cutting part and that of the slot to be cut thereby, means to carry the work in operative position relative to said cutter, and means to roll said work into and out of engagement with said cutting part.

3. In a bevel-gear generator, a cutter having a lateral cutting part, means to move said cutter in an unsymmetrical circuitous path in a plane, the portion of said path through which said cutter moves during the actual cutting operation being substantially straight, means to oscillate said cutter to make up the difference between the width of said cutting part and that of the slot to be cut thereby, and adjusting means for said first-named means.

4. In a bevel-gear generator, a cutter having a lateral cutting part, means to move said cutter in an unsymmetrical circuitous path in a plane, the portion of said path through which said cutter moves during the actual cutting operation being substantially straight, means to oscillate said cutter to make up the difference between the width of said cutting part and that of the slot to be cut thereby, adjusting means for said first-named means, means to adjust said cutter about an axis to accommodate said cutting part to the angles of said slot, and means to adjust said last-named means.

5. In a bevel-gear generator, a cutter having a lateral cutting part, means to move said cutter in an unsymmetrical circuitous path in a plane, the portion of said path through which said cutter moves during the actual cutting operation being substantially straight, means to adjust said cutter to regulate the depth of the slot cut thereby, and means to oscillate said cutter to make up the difference between the width of said cutting part and that of said slot.

6. In a bevel-gear generator, a cutter having a lateral cutting part, means to move said cutter in an unsymmetrical circuitous path in a plane, the portion of said path through which said cutter moves during the actual cutting operation being substantially straight, means to adjust said cutter to regulate the depth of the slot cut thereby, means to oscillate said cutter to make up the difference between the width of said cutting part and that of said slot, means to support the work in operative position relative to said cutter, and means to roll said work into and out of engagement with said cutting parts.

7. In a bevel-gear generator, a cutter arranged to travel in an unsymmetrical circuitous path in a plane, and having a lateral cutting part, means to adjust said cutter to regulate the depth of the slot cut thereby, means to oscillate said cutter to make up the difference between the width of the cutting part and that of said slot, and means to adjust said cutter about an axis to accommodate said cutting part to the tooth angles to be cut.

8. In a bevel-gear generator, a cutter having a lateral cutting part, means to move said cutter in an unsymmetrical circuitous path in a plane, the portion of said path through which said cutter moves during the actual cutting operation being substantially straight, means to adjust said cutter to regulate the depth of the slot to be cut thereby, means to oscillate said cutter to make up the difference between the width of said cutting part and that of said slot, means to adjust said cutter about an axis to accommodate said cutting part to the tooth angles to be cut, means to carry the work in operative position relative to said cutter, and means to roll said work into and out of engagement with said cutting part.

9. In a bevel-gear generator, a cutter having a lateral cutting part, means to move said cutter in an unsymmetrical circuitous path in a plane, the portion of said path through which said cutter moves during the actual cutting operation being substantially straight, means to tilt said cutter at the required cutting angle, and means to oscillate said cutter to make up the difference between the width of said cutting part and that of the slot to be cut.

10. In a bevel-gear generator, a cutter having a lateral cutting part, means to move said cutter in an unsymmetrical circuitous path in a plane the portion of said path through which said cutter moves during the actual cutting operation being substantially straight, means to tilt said cutter at the required cutting angle, means to oscillate said cutter to make up the difference between the width of said cutting part and that of the slot to be cut, means to support the work in operative position relative to said cutter, and means to roll said work into and out of engagement with said cutting part.

11. In a bevel-gear generator, a cutter having a lateral cutting part, means to move said cutter in an unsymmetrical circuitous path in a plane, the portion of said path through which said cutter moves during the actual cutting operation being substantially straight, means to tilt said cutter at the required cutting angle, means to oscillate said cutter to make up the difference between the width of said cutting part and that of the slot to be cut, and means to adjust said cutter about an axis to accommodate said cutting part to the tooth angles to be cut.

12. In a bevel-gear generator, a cutter having a lateral cutting part, means to move said cutter in an unsymmetrical circuitous path in a plane, the portion of said path through which said cutter moves during the actual cutting operation being substantially straight, means to tilt said cutter at the required cutting angle, means to oscillate said cutter to make up the difference between the width of said cutting part and that of the slot to be cut, means to adjust said cutter about an axis to accommodate said cutting part to the tooth angle to be cut, means to support the work in operative position relative to said cutter, and means to roll said work into and out of engagement with said cutting part.

13. In a bevel-gear generator, a cutter having a lateral cutting part, means to move said cutter in an unsymmetrical circuitous path in a plane, the portion of said path through which said cutter moves during the actual cutting operation being substantially straight, means to adjust said cutter to regulate the depth of the slot cut thereby, means to tilt said cutter at the required cutting angle, and means to oscillate said cutter to make up the difference between the width of said cutting part and that of said slot.

14. In a bevel-gear generator, a cutter having a lateral cutting part, means to move said cutter in an unsymmetrical circuitous path in a plane, the portion of said path through which said cutter moves during the actual cutting operation being substantially straight, means to adjust said cutter to regulate the depth of the slot cut thereby, means to tilt said cutter at the required cutting angle, means to oscillate said cutter to make up the difference between the width of said cutting part and that of said slot, means to support the work in operative position relative to said cutter, and means to roll said work into and out of engagement with said cutting part.

15. In a bevel-gear generator, a cutter having a lateral cutting part, means to move said cutter in an unsymmetrical circuitous path in a plane, the portion of said path through which said cutter moves during the actual cutting operation being substantially straight, means to tilt said cutter at the required cutting angle, means to oscillate said cutter to make up the difference between the width of said cutting part and that of the slot to be cut, and means to adjust said cutter about an axis to accommodate said cutting part to the tooth angles.

16. In a bevel-gear generator, a cutter having a lateral cutting part, means to move said cutter in an unsymmetrical circuitous path in a plane, the portion of said path through which said cutter moves during the actual cutting operation being substantially straight, means to tilt said cutter at the required cutting angle, means to oscillate said cutter to make up the difference between the width of said cutting part and that of the slot to be cut, means to adjust said cutter about an axis to accommodate said cutting part to tooth angles, means to carry the work in operative position relative to said cutter, and means to roll the work into and out of engagement with said cutting part.

17. In a bevel-gear generator, a cutter having a lateral cutting part, means to move said cutter in an unsymmetrical circuitous path in a plane, the portion of said path through which said cutter moves during the actual cutting operation being substantially straight, means to rock said cutter to make up the difference between the width of said cutting part and that of the slot to be cut thereby, and means partially to rotate said cutter on an axis to accommodate said cutting part to the side angles of said slot, said cutter being rocked and partially rotated in opposite directions relatively.

18. In a bevel-gear generator, a cutter having a lateral cutting part, means to move said cutter in an unsymmetrical circuitous path in a plane, the portion of said path through which said cutter moves during the actual cutting operation being substantially straight, means intermittently to rock said cutter, first in one direction and then in the other direction, to make up the difference between the width of said cutting part and that of the slot to be cut thereby, and means intermittently partially to rotate said cutter on an axis, first in one direction and then in the other direction, to accommodate said cutting part to the side angles of said slot, said cutter being rocked and partially rotated in opposite directions relatively.

19. In a bevel-gear generator, a cutter having a lateral cutting part, means to move said cutter in an unsymmetrical circuitous path in a plane, the portion of said path through which said cutter moves during the actual cutting operation being substantially straight, means to rock said cutter to make up the difference between the width of said cutting part and that of the slot to be cut thereby, means partially to rotate said cutter on an axis to accommodate said cutting part to the side angles of said slot, said cutter being rocked and partially rotated in opposite directions relatively, means to carry the work in operative position relative to said cutter, and means to roll the work into and out of engagement with said cutting part.

20. In a bevel-gear generator, a cutter having a lateral cutting part, means to move said cutter in an unsymmetrical circuitous path in a plane, the portion of said path through which said cutter moves during the actual cutting operation being substantially straight, means intermittently to rock said cutter, first in one direction and then in the other direction, to make up the difference between the width of said cutting part and that of the slot to be cut thereby, and means intermittently partially to rotate said cutter on an axis, first in one direction and then in the other direction, to accommodate said cutting part to the side angles of said slot, said cutter being rocked and partially rotated in opposite directions relatively, means to support the work in operative position relative to said cutter, and means to roll the work into and out of engagement with said cutting part.

21. In a bevel-gear generator, a cutter having a lateral cutting part, means to move said cutter in an unsymmetrical circuitous path in a plane, the portion of said path through which said cutter moves during the actual cutting operation being substantially straight, means to oscillate said cutter to make up the difference between the width of said cutter part and that of the slot to be cut thereby, and means, operating approximately simultaneously with said first-named means, to move said cutter about an axis to accommodate said cutting part to tooth angles.

22. In a bevel-gear generator, a cutter having a lateral cutting part, means to move said cutter in an unsymmetrical circuitous path in a plane, the portion of said path through which said cutter moves during the actual cutting operation being substantially straight, means to oscillate said cutter to make up the difference between the width of said cutting part and that of the slot to be cut thereby, and means, operating approximately simultaneously with said first-named means, to move said cutter about an axis to accommodate said cutting part to tooth angles, said cutter being rocked in one direction and partially rotated in the opposite direction relatively.

23. In a bevel-gear generator, a cutter having a lateral cutting part, means to move said cutter in an unsymmetrical circuitous path in a plane, the portion of said path through which said cutter moves during the actual cutting operation being substantially straight, means to support the work in operative position relative to said cutter, indexing mechanism for said work-supporting means, and means to oscillate said cutter to make up the difference between the width of said cutting part and that of the slot to be cut thereby.

24. In a bevel-gear generator, a cutter having a lateral cutting part, means to move said cutter in an unsymmetrical circuitous path in a plane, the portion of said path through which said cutter moves during the actual cutting operation being substantially straight, means to support the work in operative position relative to said cutter, indexing mechanism for said work-supporting means, means to oscillate said cutter to make up the difference between the width of said cutting part and that of the slot to be cut thereby, means to support the work in operative position relative to said cutter, and means to roll the work into and out of engagement with said cutting part.

25. In a bevel-gear generator, a cutter arranged to travel in a circuitous path on a plane, and having a cutting part which is lateral to said plane, means to hold the work in operative position relative to said cutter, indexing mechanism for said work-holding means, means to oscillate said cutter to make up the difference between the width of said cutting part and that of the slot to be cut thereby, and means approximately simultaneously to operate said indexing mechanism and said oscillatory means.

26. In a bevel-gear generator, a cutter arranged to travel in a circuitous path on a plane, and having a cutting part which is lateral to said plane, means to hold the work in operative position relative to said cutter, indexing mechanism for said work-holding means, means to oscillate said cutter to make up the difference between the width of said cutting part and that of the slot to be cut thereby, means approximately simultaneously to operate said indexing mechanism and said oscillatory means, and means to cause said work-holding means to roll the work into and out of engagement with said cutting part, after said indexing mechanism and said oscillatory means have been operated.

27. In a bevel-gear generator, a cutter-head, a cutter in said cutter-head, said cutter having a lateral cutting part, means to move said cutter therein in an unsymmetrical closed path, means to hold the work in operative position relative to said cutter, indexing mechanism for said work-holding means, and means partially to rotate said cutter-head on its longitudinal axis to accommodate said cutting part to the angles of the sides of the teeth being cut.

28. In a bevel-gear generator, a cutter-head, a cutter in said cutter-head, means to move said cutter therein in an unsymmetrical circuitous path on a plane, said cutter having a cutting part which is lateral to said plane, means to hold the work in operative position relative to said cutter, operating mechanism for said work-holding means, means partially to rotate said cutter-head on its longitudinal axis to accommodate said cutting part to the angles of the sides of the teeth being cut, and means to cause said work-holding means to roll the work into and out of engagement with said cutting part.

29. In a bevel-gear generator, a cutter, means to move said cutter in a circuitous path on a plane, the portion of said part of said path through which said cutter moves during the actual cutting operation being substantially straight, said cutter, having a cutting part which is lateral to said plane, means to hold the work in operative position relative to said cutter, indexing mechanism for said work-holding means, means to move said cutter about an axis to accommodate said cutting part to the tooth angles, and means approximately simultaneously to operate said indexing mechanism and said means for moving said cutter about said axis.

30. In a bevel-gear generator, a cutter, means to move said cutter in a circuitous path on a plane, the portion of said part of said path through which said cutter moves during the actual cutting operation being substantially straight, said cutter having a cutting part which projects from said plane, means to support the work in operative position relative to said cutter, indexing mechanism for said work-supporting means, means to move said cutter about an axis to accommodate said cutting part to the tooth angles, means approximately simultaneously to operate said indexing means and said means for moving said cutter about said axis, and means to cause said work-supporting means to roll the work into and out of engagement with said cutting part, after said indexing mechanism and said means for moving the cutter about an axis have been operated.

31. In a bevel-gear generator, a cutter-head, a cutter in said cutter-head, means to move said cutter in a circuitous path on a plane in said cutter-head, said cutter having a cutting part which is lateral to said plane, means to oscillate said cutter-head, on an axis below the longitudinal axis of the cutter-head, to compensate for the difference between the width of said cutting part and that of the slot to be cut thereby, means to rotate said cutter-head on said second-named axis to accommodate said cutting-part to the tooth angles, said axis being parallel, means to move the work in operative position relative to said cutter, and indexing mechanism for said work-holding means.

32. In a bevel-gear generator, a cutter-head, a cutter in said cutter-head, means to move said cutter in a circuitous path on a plane, said cutter having a cutting part which is lateral to said plane, means to oscillate said cutter-head, on an axis below the longitudinal axis of the cutter-head, to compensate for the difference between the width of said cutting part and that of the slot to be cut thereby, means to rotate said cutter-head on said second-named axis to accommodate said cutting part to the tooth angles, said axes being parallel, means to hold the work in operative position relative to said cutter, indexing mechanism for said work-holding means, and means to cause said work-holding means to roll said work into and out of engagement with said cutting part.

33. In a bevel-gear generator, a cutter, means to move said cutter in a circuitous path on a plane, said cutter having a cutting part which is lateral to said plane, means to oscillate said cutter to make up the difference between the width of said cutting part and that of the slot to be cut thereby, means to move said cutter about an axis to accommodate said cutting part to the tooth angles, means to hold the work in operative position relative to said cutter, indexing mechanism for said work-holding means, and means approximately simultaneously to actuate said oscillatory means, said means for moving said cutter about said axis, and said indexing mechanism.

34. In a bevel-gear generator, a cutter, means to move said cutter in a circuitous path on a plane, said cutter having a cutting part which is lateral to said plane, means to oscillate said cutter to make up the difference between the width of said cutting part and that of the slot to be cut thereby, means to move said cutter about an axis to accommodate said cutting part to the tooth angles, means to hold the work in operative position relative to said cutter, indexing mechanism for said work-holding means, means approximately simultaneously to actuate said oscillatory means, said means for moving the cutter about an axis, and said indexing means, and means to cause said work-holding means to roll said work into and out of engagement with said cutting part, after said oscillatory means, said means for moving the cutter about said axis, and said indexing mechanism have been operated.

35. In a bevel-gear generator, a cutter, means to move said cutter in a circuitous path on a plane, said cutter having a cutting part which is lateral to said plane, means to support the work in operative position relative to said cutter, and means twice to roll said work into and out of engagement with said cutting part during the cutting thereby of a tooth slot.

36. In a bevel-gear generator, a cutter, means to move said cutter in a circuitous path on a plane, said cutter having a cutting part which is lateral to said plane, means to hold the work in operative position relative to said cutter, means twice to roll said work into and out of engagement with said cutting part during the cutting thereby of a tooth.

37. In a bevel-gear generator, a cutter, means to move said cutter in a circuitous path on a plane, said cutter having a cutting part which is lateral to said plane, means to support the work in operative position relative to said cutter, means twice to roll said work into and out of engagement with said cutting part during the cutting of a tooth, and means, operating between the time such rolling motions occur, to move the work a distance equal to the width of a tooth.

38. In a bevel-gear generator, a cutter, means to move said cutter in a circuitous path on a plane, said cutter having a cutting part which is lateral to said plane, means to oscillate said cutter to make up the difference between the width of said cutting parts and the slot to be cut thereby, means to support the work in operative position relative to said cutter, means twice to roll said work into and out of engagement with said cutting part during the cutting of a tooth slot, and means, operating between the times such rolling motions occur, to oscillate said cutter to make up the difference between the width of said cutting part and that of said slot.

39. In a bevel-gear generator, a cutter, means to move said cutter in a circuitous path on a plane, said cutter having a cutting part which is lateral to said plane, means to support the work in operative position relative to said cutter, means twice to roll said work into and out of engagement with said cutting part during the cutting of a tooth slot, and means, operating between the times of such rolling operations, to move said cutter about an axis to accommodate said cutting part to the side angles of said slot.

40. In a bevel-gear generator, a cutter, means to move said cutter in a circuitous path on a plane, said cutter having a cutting part which is lateral to said plane, means to support the work in operative position relative to said cutter, means twice to roll the work into and out of engagement with said cutting part during the cutting of a tooth slot, means operating between the times of such rolling motions, to oscillate said cutter to make up the difference between the width of said cutting part and that of said slot, and means to move said cutter about an axis to accommodate said cutting part to the side angles of said slot.

41. In a bevel-gear generator, a cutter, means to move said cutter in a circuitous path on a plane, said cutter having a cutting part which is lateral to said plane, means to oscillate said cutter to make up the difference between the width of said cutting part and that of the slot to be cut thereby, means to move said cutter about an axis to accommodate said cutting parts to the side angles of said slot, means to support the work in operative position relative to said cutter, indexing mechanism for said work-supporting means, means to roll said work into and out of engagement with said cutting part, and means approximately simultaneously to operate said oscillatory means, said means for moving said cutter about said axis, and said indexing mechanism, before said work-rolling means is operated.

42. In a bevel-gear generator, supporting members having horizontal grooves therein, a carriage comprising blocks arranged to slide in said grooves, and a shaft connecting said blocks, an adjusting screw for one of said blocks, a carrier mounted on said carriage, and a cutter-head mounted on said carrier.

43. In a bevel-gear generator, a frame, a carriage supported in said frame, a carrier pivotally connected at the forward end with said carriage, means applied to the rear end of said carrier to tilt the same on said carriage, a cutter-head, and a support mounted on said carrier for said cutter-head.

44. In a bevel-gear generator, a frame, a carriage supported to slide in said frame, means to actuate said carriage longitudinally for adjustment, a carrier pivotally connected at the forward end with said carriage, means applied to the rear end of said carrier to tilt the same on said carriage, a cutter-head, and a support mounted on said carrier for said cutter-head.

45. In a bevel-gear generator, a frame, a carrier supported to slide in said frame, means to actuate said carriage longitudinally for adjustment, a carrier pivotally connected at the forward end with said carriage, means applied to the rear end of said carrier to tilt the same on said carriage, a cutter-head, a support mounted on said cutter-head, and means to lock said carrier and carriage after adjustment.

46. In a bevel-gear generator, a frame, a carriage supported to slide in said frame, means to actuate said carriage longitudinally for adjustment, a carrier pivotally connected at the forward end with said carriage, means applied at the rear end of said carrier to adjust the same on said carriage, a cutter-head, a support mounted on said carrier for said cutter-head, and a screw tapped into said frame and arranged to bear against one side of said carrier to lock the same in said carriage after adjustment.

47. In a bevel-gear generator, a frame, supporting means supported by said frame, a ring-bearing having a part pivotally connected with said supporting means, and a cylindrical cutter-head mounted in said ring-bearing, the longitudinal axes of the pivotal connection and said cutter-head being parallel.

48. In a bevel-gear generator, a frame, a carriage supported by said frame, a carrier supported by said carriage, a bearing member pivotally mounted in said carrier, and a cylindrical cutter-head mounted in said bearing member, the axis of the pivotal connection of said bearing member and the longitudinal axis of said cutter-head being parallel.

49. In a bevel-gear generator, a frame, a carriage supported by said frame, a carrier pivotally connected with said carriage, a bearing member pivotally connected with said carrier, at right-angles to the pivotal connection between said carrier and carriage, and a cylindrical cutter-head mounted in said bearing member, the axis of the pivotal connection of said bearing member and the longitudinal axis of said cutter-head being parallel.

50. In a bevel-gear generator, a frame, a carriage supported by said frame, a carrier supported by said carriage, a bearing member supported by said carrier, a cylindrical cutter-head mounted for partial rotation on its longitudinal axis in said bearing member, and a cutter arranged to travel in an unsymmetrical closed path in said cutter-head.

51. In a bevel-gear generator, a frame, a carriage supported by said frame, a carrier supported by said carriage, a bearing member pivotally supported by said carrier, and a cylindrical cutter-head mounted for rotation on its longitudinal axis in said bearing member, the axis of the pivotal support for said bearing and said cutter-head axis being parallel.

52. In a bevel-gear generator, a frame, a supporting member in said frame, a cutter-head mounted for partial rotation in opposite directions on its longitudinal axis in said supporting member, means to limit the amount of such rotation, and a cutter arranged to travel in said cutter-head.

53. In a bevel-gear generator, a frame, a bearing member mounted in said frame, a cylindrical cutter-head mounted for partial rotation on its longitudinal axis in opposite directions in said bearing member, automatic means to actuate said cutter-head, and means to limit the amount of such rotation.

54. In a bevel-gear generator, a recessed frame provided with oppositely-disposed fixed stop members which project into the recess therein, a bearing member pivotally mounted in said recess between said stop members, automatic means to oscillate said bearing member therebetween, for partial rotation on its longitudinal axis in opposite directions, a cylindrical cutter-head mounted in said bearing member, automatic means to actuate said cutter-head, and means to limit the amount of the rotation thereof, the axes of said bearing member and cutter-head being parallel.

55. In a bevel-gear generator, a carrier, a shaft in said carrier, a bearing member and a bed mounted on and secured to said shaft, a cutter-head mounted in said bearing member, a cutter in said cutter-head, means to move said cutter in an unsymmetrical closed path in said cutter-head, a motor mounted on said bed, and means to drive said cutter from said motor.

56. In a bevel-gear generator, a carrier, a rock shaft in said carrier, a bearing member and a bed mounted on and secured to said shaft, a cutter-head mounted for partial rotation in said bearing member, a cutter in said cutter-head, means to move said cutter in an unsymmetrical closed path in said cutter-head, a motor on said bed, and means to drive said cutter from said motor.

57. In a bevel-gear generator, a carrier, a rock-shaft in said carrier, a bearing member and a bed mounted on and secured to said shaft, a cutter-head mounted in said bearing member, a cutter in said cutter-head, means to move said cutter in an unsymmetrical closed path in said cutter-head, a motor on said bed, means to drive said cutter from said motor, and automatic means to oscillate said bearing member.

58. In a bevel-gear generator, a carrier, a shaft in said carrier, a bearing member and a bed mounted on and secured to said shaft, a cutter-head mounted in said bearing member, a cutter in said cutter-head, means to move said cutter in an unsymmetrical closed path in said cutter-head, a motor on said bed, means to drive said cutter from said motor, and automatic means partially to rotate said cutter-head on its longitudinal axis in opposite directions in said bearing member.

59. In a bevel-gear generator, a carrier, a rock shaft in said carrier, a bearing member and a bed mounted on and secured to said shaft, a cutter-head mounted in said bearing member, a cutter in said cutter-head, means to move said cutter in said cutter-head in an unsymmetrical closed path in a plane at right-angles to the longitudinal axis of said cutter-head, a motor on said bed, means to drive said cutter from said motor, automatic means to oscillate said bearing member, and automatic means partially to rotate said cutter-head on its longitudinal axis in opposite directions in said bearing member, the axes of said bearing member and said cutter-head being parallel to enable the oscillation to occur without changing the plane of said path.

60. In a bevel-gear generator, a carrier, a bearing member mounted to oscillate in said carrier, operating means mounted on said bearing member to oscillate the same, a cylindrical cutter-head mounted for partial rotation on its longitudinal axis in opposite directions in said bearing member, a cutter in said cutter-head, means to move said cutter in said cutter-head in an unsymmetrical closed path in a plane at right-angles to said axis, the axes of said bearing member and said cutter-head being parallel to enable the oscillation to occur without changing the plane of said path.

61. In a bevel-gear generator, a carrier, a bearing member supported by said carrier, a cylindrical cutter-head mounted for rotation on its longitudinal axis in said bearing member, a cutter in said cutter-head, means to move said cutter in a closed path in said cutter-head, and automatic operating means mounted on said bearing member for said cutter-head.

62. In a bevel-gear generator, a carrier, a bearing member supported by said carrier, a cylindrical cutter-head mounted for rotary motion on its longitudinal axis in said bearing member, a cutter in said cutter-head, means to move said cutter in a closed path in said cutter-head, automatic operating means for said cutter-head mounted on said bearing member, and means to limit the amount of rotation of said cutter-head.

63. In a bevel-gear generator, a carrier, a bearing member mounted to oscillate in said carrier, a cylindrical cutter-head mounted for rotary motion on its longitudinal axis in said bearing member, a cutter in said cutter-head, means to move said cutter in an unsymmetrical closed path in said cutter-head, which path is in a plane at right-angles to said axis, and means mounted on said bearing member to oscillate the same and partially rotate said cutter-head, the axes of said bearing member and cutter-head being parallel to enable the oscillation to occur without changing said plane.

64. In a bevel-gear generator, a carrier, a bearing member supported by said carrier, a cutter-head mounted for rotary motion on its longitudinal axis in said bearing member, a cutter in said cutter-head, means to move said cutter in a closed path in said cutter-head, and means mounted on said bearing member partially to rotate said cutter-head and automatically limit the rotary motion thereof.

65. In a bevel-gear generator, a carrier, a bearing member mounted to oscillate in said carrier, a cylindrical cutter-head mounted for rotation on its longitudinal axis in said bearing member, a cutter in said cutter-head, means to move said cutter in an unsymmetrical closed path in said cutter-head, in a plane at right-angles to said axis, and means mounted on said bearing member to oscillate said carrier and partially rotate said cutter-head, such means including means to limit the rotation of said cutter-head, and the axes of said bearing member and cutter-head being parallel to enable the oscillation to occur without changing said plane.

66. In a bevel-gear generator, a carrier, a bearing member mounted to oscillate in said carrier, means to limit the amount of oscillation of said carrier, a cylindrical cutter-head mounted for rotary motion on its longitudinal axis in said bearing member, a cutter in said cutter-head, means to move said cutter in an unsymmetrical closed path in said cutter-head, in a plane at right-angles to said axis, and means mounted on said bearing member to oscillate the same and partially rotate said cutter-head, such means including limiting means for the rotation of said cutter-head, and the axes of said bearing member and cutter-head being parallel to enable the oscillation to occur without changing said plane.

67. In a bevel-gear generator, a frame, a carrier in the recess in said frame, a bearing member mounted to oscillate on said carrier, a cylinder mounted on said bearing member, and having a piston therein from which extends rods to contact with the sides of said recess, means to introduce fluid under pressure into said cylinder alternately on opposite sides of said piston, whereby said bearing member is caused to oscillate, and a cutter-head mounted in said bearing member.

68. In a bevel-gear generator, a carrier, a bearing member supported by said carrier, a cylinder having a piston therein mounted on said bearing member, means to introduce fluid under pressure into said cylinder alternately on opposite sides of said piston, and a cutter-head mounted to rotate in said bearing member, and provided with a part which is in the path of said piston, whereby said cutter-head is partially rotated in opposite directions.

69. In a bevel-gear generator, a carrier, a bearing member supported by said carrier, a cylinder mounted on said bearing member, and provided with a piston, said cylinder being slotted and said piston grooved to receive a pin, means to introduce fluid under pressure into said cylinder alternately on opposite sides of said piston, and a cutter-head mounted to rotate in said bearing member, and provided with a pin which extends through said slot into said groove, whereby said cutter-head is partially rotated in opposite directions by said piston.

70. In a bevel-gear generator, a carrier, a bearing member supported by said carrier, a cylinder mounted on said bearing member, having a piston therein, and provided with stop members, means to introduce fluid under pressure into said cylinder alternately on opposite sides of said piston, and a cutter-head mounted to rotate in said bearing member, and provided with a member which extends between said stop members and into engagement with said piston, whereby said cutter-head is partially rotated in opposite directions by said piston.

71. In a bevel-gear generator, a carrier, a bearing member supported by said carrier, a cylinder mounted on said bearing member, having a piston therein, and provided with lugs in which are stop screws, means to introduce fluid under pressure into said cylinder alternately on opposite sides of said piston, and a cutter-head mounted to rotate in said bearing member, and provided with a member which projects between said screws and into engagement with said piston, whereby said cutter-head is partially rotated in opposite directions by the piston.

72. In a bevel-gear generator, a recessed frame, a carrier in the recess in said frame, a bearing member mounted to oscillate in said carrier, a twin-cylinder casing mounted on said bearing member, and having therein intercommunicating chambers and ports between said chambers, pistons in said chambers between said ports, one of said pistons being provided with rods which extend beyond the ends of said casing to engage the sides of said recess, a cutter-head mounted to rotate in said bearing member, and provided with a member which engages the other of said pistons, and means to introduce fluid under pressure into said casing alternately on opposite sides of said first-named piston, whereby said bearing member is caused to be rocked, first in one direction and then in the other, and said cutter-head is caused to be partially rotated, first in one direction and then in the other, the directions of the oscillatory and rotary movements always being opposite to each other.

73. In a bevel-gear generator, a recessed frame, a carrier in said frame, a bearing member pivotally mounted in said carrier, a cylinder mounted on said bearing member, and provided with a piston which has stems that extend through said cylinder to act on the sides of the recess in said frame, means to introduce fluid under pressure into said cylinder alternately on opposite sides of said piston, adjustable stop means in the sides of said recess for said bearing member, and a cutter-head in said member.

74. In a bevel-gear generator, a recessed frame, a carrier in said frame, a bearing member mounted to oscillate in said carrier, a twin-cylinder casing mounted in said bearing member, having therein chambers which communicate with each other through, and provided with stop members, pistons in said chambers between said ports, one of said pistons having rods which extend out of said casing to operate against the sides of said recess, means to introduce fluid under pressure into said casing alternately on opposite sides of said first-named piston, adjustable stop means in opposite sides of said recess for said bearing member, and a cutter-head mounted to rotate in said bearing member, and provided with a member which extends between said stop members into engagement with the second piston.

75. In a bevel-gear generator, a carrier, a bearing member mounted in said carrier, a cylinder mounted on said bearing member, and provided with a piston, means to admit fluid under pressure to said cylinder alternately on opposite sides of said piston, a cutter-head mounted in said bearing member, and a member adjustably connected with said cutter-head, and having a part which projects into engagement with said piston.

76. In a bevel-gear generator, a shaft, a bearing member mounted on said shaft, a cylindrical cutter-head mounted in said member, means intermittently to impart to said member an oscillatory motion, and means intermittently to impart to said cutter-head a revoluble motion on its longitudinal axis, said shaft and axis being parallel.

77. In a bevel-gear generator, a shaft, a bearing member mounted on said shaft, a cylindrical cutter-head mounted on said member, means intermittently to impart to said member an oscillatory motion, and means intermittently to impart to said cutter-head a revoluble motion on its longitudinal axis, in opposite directions, said shaft and axis being parallel.

78. In a bevel-gear generator, a shaft, a bearing member mounted on said shaft, a cylindrical cutter-head mounted in said member, means intermittently to impart to said member an oscillatory motion, and means intermittently to impart to said cutter-head a revoluble motion on its longitudinal axis, said motions being approximately simultaneous in opposite directions, and said shaft and axis being parallel.

79. In a bevel-gear generator, a cutter, an actuating member therefor loosely connected therewith, and means to cause said cutter and said actuating member to move through different closed paths, said means comprising path-forming guide members for said cutter and path-forming guide members for said actuating member.

80. In a bevel-gear generator, a cutter, an actuating member therefor loosely connected therewith, and means to cause said cutter and said actuating member to move through different unsymmetrical closed paths, said means comprising path-forming guide members for said cutter, and path-forming guide members for said actuating member.

81. In a bevel-gear generator, a cutter-head, and a cutter and a loosely connected actuating member therefor, said cutter and actuating member being arranged side by side to travel in different circuitous paths in said cutter-head.

82. In a bevel-gear generator, a cutter-head having therein two cam grooves forming two closed paths, a cutter arranged to travel loosely in one of said grooves, and means arranged to travel loosely in the other of said grooves to actuate said cutter.

83. In a bevel-gear generator, a cutter, a cutter-head provided with means to carry said cutter around one axis, and means operated in said cutter-head to swing said cutter on another axis parallel with the first.

84. In a bevel-gear generator, a cutter-head, a rotary member in said cutter-head, means to drive said member, a block pivotally connected with said rotary member, a second block pivotally connected with said first-named block, a cutter-bar secured to said second block, guide members in said cutter-head for said first-named block, and guide members in said cutter-head for said second block.

85. In a bevel-gear generator, a cutter-head having outer and inner channel-forming parts, a rotary member in said cutter-head, means to rotate said member, a block pivotally connected with said member and adapted to be guided by said inner channel-forming parts, a second block pivotally connected with the first and adapted to be guided by said outer channel-forming parts, and a cutter-bar secured to said second block.

86. In a bevel-gear generator, a cutter-head having outer and inner channel-forming parts, one of said outer channel-forming parts being adjustable, a rotary member in said cutter-head, means to rotate said member, a block pivotally connected with said rotary member and adapted to be guided by said inner channel-forming parts, a second block pivotally connected with the first and adapted to be guided by said outer channel-forming parts, and a cutter-bar secured to said second block.

87. In a bevel-gear generator, a cutter-head having outer and inner channel-forming parts, one of said outer channel-forming parts being pivotally connected with another of such parts to form a gate, a rotary member in said cutter-head, means to drive said member, a block pivotally connected with said rotary member and adapted to be guided by said inner channel-forming parts, a second block pivotally connected with the first and adapted to be guided by said outer channel-forming parts, and a cutter-bar secured to said second block.

88. In a bevel-gear generator, a cutter-head, a rotary member in said cutter-head, a block provided with means pivotally to attach the same to said rotary member, a second block pivotally attached to the first, and provided with a cutting element, said blocks having arcuate interengaging parts.

89. In a bevel-gear generator, a cutter-head, a rotary member in said cutter-head, means to drive said member, a block provided with means at one end to connect the same pivotally with said rotary member, a second block having a slot therein, a recessed pivot connecting said second block with the first at the end of the latter which is opposite to that provided with said pivotal means, and extending into said slot, said blocks having arcuate interengaging parts at the ends opposite to said pivot, and a cutter-bar inserted in said slot with one end in the recess in said pivot.

90. In a bevel-gear generator, a cutter-head, a gear in said cutter-head, a cutter carried by said gear, a shaft journaled in said cutter-head, and provided at one end with a pinion to intermesh with said gear, and at the other end with a gear, a second shaft having one end journaled in said cutter-head, and provided with a gear to intermesh with said gear on said first-named shaft, means to drive said second-named shaft, and means partially to rotate said cutter-head.

91. In a bevel-gear generator, a cutter-head, a gear in said cutter-head, a cutter carried by said gear, a shaft journaled in said cutter-head, and provided at one end with a pinion to intermesh with said gear, and at the other end with a gear, a second shaft having one end journaled in said cutter-head, and provided with a gear to intermesh with said gear on said first-named shaft, and oscillatory supporting means for said cutter-head.

92. In a bevel-gear generator, a cutter-head, a gear in said cutter-head, a cutter carried by said gear, a shaft journaled in said cutter-head, and provided at one end with a pinion to intermesh with said gear, and at the other end with a gear, a second shaft having one end journaled in said cutter-head, and provided with a gear to intermesh with said gear on said first-named shaft, means to drive said second-named shaft, and oscillatory supporting means for said cutter-head and the driving means for said second-named shaft.

93. The combination, in a bevel-gear generator, with a cutter-head, a rotary member in said cutter-head, and a cutter comprising parts carried by said rotary member, and arranged to travel in different circuitous paths in parallel planes, and having a cutting part which projects from one of said planes, of oscillatory supporting means for said cutter-head.

94. The combination, in a bevel-gear generator, with a cutter-head, a rotary member in said cutter-head, means to drive said member, and a cutter comprising parts carried by said rotary member, and arranged to travel in different circuitous paths in parallel planes, and having a cutting part projecting from one of said planes, of oscillatory supporting means for said cutter-head and said driving means.

95. In a bevel-gear generator, a frame, a member movably supported by said frame, and work-holding means, indexing means for said work-holding means, and hydraulic-operating means for said indexing means all carried by said member.

96. In a bevel-gear generator, a frame, a member movably supported by said frame, and work-holding means, work-rolling means, and hydraulic-operating means for said work-rolling means all carried by said member.

97. In a bevel-gear generator, a frame, a member movably supported by said frame, and work-holding means, indexing means for said work-holding means, work-rolling means, hydraulic-operating means for said indexing means, and hydraulic-operating means for said work-rolling means all carried by said member.

98. In a bevel-gear generator, a frame, a member hinged to one side of said frame, and work-holding means carried by said member, said member being adapted, when swung open, to move said work-holding means into inoperative position, and, when swung into closed position, to locate said work-holding means in operative position.

99. In a bevel-gear generator, a frame, a member hinged to one side of said frame, and inseparably associated work-holding means and work-indexing means carried by said member, the latter being adapted, when swung open, to move said work-holding means with said work-indexing means into inoperative position, and, when swung into closed position, to locate said work-holding means with said work-indexing means in operative position.

100. In a bevel-gear generator, a frame, a member hinged to one side of said frame, and inseparably associated work-holding means and work-rolling means carried by said member, the latter being adapted, when swung open, to move said work-holding means with said work-rolling means into inoperative position, and, when swung into closed position, to locate said work-holding means with said work-rolling means in operative position.

101. In a bevel-gear generator, a frame, a member hinged to one side of said frame, and inseparably associated work-holding means, indexing means for said work-holding means, and hydraulic-operating means for said indexing means all carried by said member, the latter being adapted, when swung open, to move said work-holding means with said indexing means and hydraulic-operating means into inoperative position, and, when swung into closed position, to locate said work-holding means with said indexing means and hydraulic-operating means in operative position.

102. In a bevel-gear generator, a frame, a member hinged to one side of said frame, and inseparably associated work-holding means, work-rolling means, and hydraulic-operating means for said work-rolling means all carried by said member, the latter being adapted, when swung open, to move said work-holding means with said work-rolling means and hydraulic-operating means into inoperative position, and, when swung into closed position, to locate said work-holding means with said work-rolling means and hydraulic-operating means in operative position.

103. In a bevel-gear generator, a frame, a member arranged to swing from said frame, and work-holding means, indexing means for said work-holding means, work-rolling means, hydraulic-operating means for said indexing means, and hydraulic-operating means for said work-rolling means all carried by said member.

104. In a bevel-gear generator, a frame, a gate hinged at one edge to the front of said frame, and work-holding means and work-indexing means, the latter including hydraulic-operating means therefor, carried by said gate.

105. In a bevel-gear generator, a frame, a gate hinged at one edge to the front of said frame, and work-holding means and work-rolling means, the latter including hydraulic-operating means therefor, carried by said gate.

106. In a bevel-gear generator, a frame, a gate hinged to said frame, and work-holding means, indexing means for said work-holding means, said indexing means including hydraulic-operating means therefor, and work-rolling means including hydraulic-operating means therefor, all carried by said gate.

107. In a bevel-gear generator, a frame, a support on the front of said frame, and rotatable on a horizontal axis, work-holding means carried by said support, a crown-gear member fixed to the front of said frame, a master-gear member operatively connected with said work-holding means and intermeshing with said crown-gear member, and means partially to rotate said support.

108. In a bevel-gear generator, a frame, a gate hinged at one edge to the front of said frame, a support carried by said gate, and rotatable on a horizontal axis, work-holding means carried by said support, a crown-gear member fixed to front of said gate, a master-gear member operatively connected with said work-holding means and intermeshing with said crown-gear member, and means partially to rotate said support.

109. In a bevel-gear generator, a frame, a gate hinged at one edge to the front of said frame, and provided on the front with a fixed crown-gear member, a support carried by said gate, and rotatable on a horizontal axis, means to actuate said support in opposite directions, work-holding means carried by said support, and a master-gear member operatively connected with said work-holding means and intermeshing with said crown-gear member.

110. In a bevel-gear generator, a frame, a crown-gear member fixed to the front of said frame, a support on the front of said frame, and rotatable on a horizontal axis, means to actuate said support in opposite directions, work-holding means carried by said support, and a master-gear member operatively connected with said work-holding means and intermeshing with said crown-gear member.

111. In a bevel-gear generator, a frame, a crown-gear member on said frame, a rotatable support on said frame and provided with a segmental-gear, a rack on said frame intermeshing with said segmental-gear, means intermittently to actuate said rack, work-holding means carried by said support, and a master-gear member operatively connected with said work-holding means and intermeshing with said crown-gear member.

112. In a bevel-gear generator, a frame, a gate hinged to said frame, and provided with a crown-gear member, a rotatable support carried by said gate, and provided with a segmental-gear, a rack carried by said gate and intermeshing with said segmental-gear, means intermittently to actuate said rack, work-holding means carried by said support, and a master-gear member operatively connected with said work-holding means and intermeshing with said crown-gear member.

113. In a bevel-gear generator, a frame, a crown-gear member on said frame, a rotatable support on said frame, hydraulic means to actuate said support in opposite directions, and a master-gear member operatively connected with said work-holding means and intermeshing with said crown-gear member.

114. In a bevel-gear generator, a frame, a crown-gear member on said frame, a support provided with a segmental-gear, said support being rotatably connected with said frame, a rack on said frame and intermeshing with said segmental-gear, hydraulic means on said frame and adapted intermittently to actuate said rack, and a master-gear member operatively connected with said work-holding means and intermeshing with said crown-gear member.

115. In a bevel-gear generator, a frame, a gate hinged to said frame, and provided with a crown-gear member, a support rotatably mounted on said gate, hydraulic means carried by said gate to actuate said support in opposite directions, and a master-gear member operatively connected with said work-holding means and intermeshing with said crown-gear member.

116. In a bevel-gear generator, a frame, a gate hinged to said frame, and provided with a crown-gear member, a support provided with a segmental-gear, said support being rotatably mounted on said gate, a rack carried by said gate and intermeshing with said segmental-gear, hydraulic means also carried by said gate and adapted intermittently to actuate said rack, and a master-gear member operatively connected with said work-holding means and intermeshing with said crown-gear member.

117. In a bevel-gear generator, a frame, a gate hinged to one side of said frame, supporting means carried by said gate, work-holding means mounted in said supporting means, indexing means mounted on said work-holding means, and means intermittently to actuate said indexing means, said gate being adapted, when swung open, to move said work-holding means with said indexing means and its actuating means, and, when swung into closed position, to locate said work-holding means with said indexing means and its actuating means in operative position.

118. In a bevel-gear generator, a frame, a gate hinged to said frame, supporting means carried by said gate, work-holding means mounted in said supporting means, indexing means mounted on said work-holding means, and hydraulic-operating means, for said indexing means, also carried by said supporting means.

119. In a bevel-gear generator, a frame, a crown-gear member on said frame, a rotatable support carried by said frame, hydraulic-operating means for said support, work-holding means mounted in said support, a master-gear member operatively connected with said work-holding means and intermeshing with said crown-gear member, indexing means mounted on said work-holding means, and hydraulic-operating means for said indexing means.

120. In a bevel-gear generator, a frame, a crown-gear member supported by said frame, a rotatable support carried by said frame, and provided with a segmental-gear, a rack supported by said frame and intermeshing with said segmental-gear, hydraulic operating means for said rack, work-holding means mounted in said support, a master-gear member operatively connected with said work-holding means, and intermeshing with said crown-gear member, indexing means mounted on said work-holding means, and hydraulic-operating means for said indexing means.

121. In a bevel-gear generator, a frame, a gate hinged to said frame, and provided with a crown-gear member, a rotatable support carried by said gate, and provided with a segmental-gear, a rack carried by said gate and intermeshing with said segmental-gear, hydraulic-operating means for said rack, said means also being carried by said gate, work-holding means mounted in said support, a master-gear member operatively connected with said work-holding means and intermeshing with said crown-gear member, indexing means mounted on said work-holding means, and hydraulic-operating means for said indexing means, said hydraulic-operating means also being mounted on said support.

122. In a bevel-gear generator, a frame, a gate hinged to said frame, and provided with a support, work-holding means carried by said support, indexing mechanism, consisting in part of a toothed member, mounted on said work-holding means, a rack also carried by said support and intermeshing with said toothed member, and means intermittently to actuate said rack.

123. In a bevel-gear generator, a frame, a gate hinged to said frame, and provided with a support, work-holding means carried by said support, indexing mechanism, consisting in part of a toothed member, mounted on said work-holding means, a rack also carried by said support, and intermeshing with said toothed member, and hydraulic-operating means mounted on said support for said rack.

124. In a bevel-gear generator, a frame, a gate hinged at one edge to the face of said frame, and provided with arcuate supporting members, work-holding means, and supporting means for said work-holding means, which supporting means is attached and adjustable relative to said supporting members, the construction and arrangement of parts being such that, when said gate is closed, said work-holding means is located in operative position, and, when said gate is opened, said work-holding means is carried into inoperative position.

125. In a bevel-gear generator, a frame, a gate hinged at one edge to the face of said frame, and provided with arcuate supporting members, work-holding means, supporting means for said work-holding means, which supporting means is attached and adjustable relative to said supporting members, indexing mechanism mounted on said work-holding means, and operating means for said mechanism, the construction and arrangement of parts being such that, when said gate is closed, said work-holding means is located in operative position, and, when said gate is opened, said work-holding means is carried into inoperative position.

126. The combination, in a bevel-gear generator, with supporting means consisting in part of a bearing, of a sleeve mounted in said bearing, a hollow spindle mounted in said sleeve, said spindle having a flange at the inner end, a nut having a hollow part received in the outer end of said sleeve and in threaded engagement with the contiguous terminal of said spindle, a collar between the inner end of said sleeve and said flange, a mandrel adapted to be passed through a gear blank and received in the inner end of said spindle, a draw-rod passing through said nut and spindle into threaded engagement with said mandrel, and a hand-wheel on the outer terminal of said draw-rod, such hand-wheel and terminal being in threaded engagement with each other.

127. The combination, in a bevel-gear generator, with supporting means consisting in part of a bearing, of a sleeve mounted in said bearing, a hollow spindle mounted in said sleeve, said spindle having a flange at the inner end, a collar between the inner end of said sleeve and said flange, which collar determines the amount of the projection of a gear blank into the cutting field, and means to secure such blank against the inner end of said spindle and to release the same.

128. The combination, in a bevel-gear generator, with supporting means consisting in part of a bearing, of a sleeve mounted in said bearing, a hollow spindle mounted in said sleeve, said spindle having a flange at the inner end, a collar between the inner end of said sleeve and said flange, which collar determines the amount of projection of a gear blank into the cutting field, a pin connecting said collar with said spindle, and means to secure such blank against the inner end of said spindle and to release the same.

129. The combination, in a bevel-gear generator, with supporting means consisting in part of a bearing, of a sleeve mounted in said bearing, a hollow spindle mounted in said sleeve, said spindle having a flange at the inner end, a nut having a hollow part received in the outer end of said sleeve and in threaded engagement with the contiguous terminal of said spindle, a collar between the inner end of said sleeve and said flange, a pin extending through said flange and collar into said sleeve, a mandrel adapted to be passed through a gear blank and received in the inner end of said spindle, a draw-rod passing through said nut and spindle into threaded engagement with said mandrel, and a hand-wheel on the outer terminal of said draw-rod, such hand-wheel and terminal being in threaded engagement with each other.

130. The combination, in a bevel-gear generator, with supporting means consisting in part of a bearing, of a sleeve mounted in said bearing, a hollow spindle mounted in said sleeve, said spindle having a flange at the inner end, a nut having a hollow part received in the outer end of said sleeve and in threaded engagement with the contiguous terminal of said spindle, a collar between the inner end of said sleeve and said flange, a pin extending through said flange and collar into said sleeve, a mandrel adapted to be passed through a gear blank and received in the inner end of said spindle, a draw-rod passing through said nut and spindle into threaded engagement with said mandrel, a hand-wheel on the outer terminal of said draw-rod, such hand-wheel and terminal being in threaded engagement with each other, and a pin projecting from the inner end of said spindle to enter a recess in said blank.

131. The combination, in a bevel-gear generator, with a supporting member provided with a crown-gear-segment, a rotatable support mounted on said supporting member, means intermittently partially to rotate said support in opposite directions, and a bearing member carried by said support, of a sleeve journaled in said bearing member, releasable work-holding members secured to said sleeve, and a master-gear segment operatively connected with said sleeve, and intermeshing with said crown-gear segment.

132. The combination, in a bevel-gear generator, with a supporting member provided with a fixed crown-gear segment, a rotatable support having a ring base mounted on said supporting member, and means intermittently partially to rotate said support through the medium of said base, of work-holding means carried by said support, and a master-gear segment operatively connected with said work-holding means and intermeshing with said crown-gear segment.

133. The combination, in a bevel-gear generator, with a supporting member provided with a crown-gear segment, a rotatable support mounted on said supporting member, means intermittently partially to rotate said support, and a bearing member carried by said support, of a sleeve journaled in said bearing member, work-rolding members secured to said sleeve, a member mounted on said sleeve, means to secure said last-named member to and release it from said sleeve, and a master-gear segment secured to said last-named member and intermeshing with said crown-gear segment.

134. The combination, in a bevel-gear generator, with a supporting member provided with a crown-gear segment, a rotatable support mounted on said supporting member, means intermittently partially to rotate said support in opposite directions, and a bearing member carried by said support, of a sleeve journaled in said bearing member, work-holding members secured to said sleeve, clutch members mounted on and adapted to engage said sleeve for rotation and to disengage the same, and a master-gear segment secured to one of said clutch members and intermeshing with said crown-gear segment.

135. The combination, in a bevel-gear generator, with a supporting member provided with a crown-gear segment, a rotatable support mounted on said supporting member, and a bearing member carried by said support, of a sleeve journaled in said bearing member, work-holding members secured to said sleeve, a clutch-member also secured to said sleeve, a second clutch-member mounted on said sleeve, means to lock said clutch-members together, and a master-gear segment secured to said second clutch-member, and intermeshing with said crown-gear segment.

136. The combination, in a bevel-gear generator, with a supporting member having outwardly-extending arcuate supports, a bearing block having a convex part fitted to said supports on their concave sides, a clamp having a concave part mounted on the convex sides of said supports, and screw-threaded members to bind said clamp and block to said supports, of a sleve journaled in said block, and work-holding members carried by said sleeve.

137. The combination, in a bevel-gear generator, with a supporting member having outwardly-extending arcuate supports arranged side by side and spaced from each other, bearing block having a convex part fitted to said supports on their concave sides and having a part that extends between the supports, a clamp having a concave part mounted on the concave sides of said supports and having a part that also extends between the supports, and screw-threaded members to bind said clamp and block to said supports, of a sleeve journaled in said block, work-holding members carried by said sleeve, and indexing mechanism for said work-holding members also carried by said sleeve.

138. In a bevel-gear generator, a vertical supporting member provided with a fixed crown-gear segment, an arcuate support carried by said supporting member, with its central radius at right-angles to said member, and rotatable on said radius, work-holding means carried by said support, and a master-gear segment operatively connected with said work-holding means and intermeshing with said crown-gear segment.

139. In a bevel-gear generator, a vertical supporting member provided with a fixed crown-gear segment, a ring having outwardly-extending arcuate supports, said ring being rotatably connected with the face of said supporting member, work-holding means carried by said arcuate supports, and a master-gear segment operatively connected with said work-holding means and intermeshing with said crown-gear segment.

140. The combination, in a bevel-gear generator, with a supporting member provided with outwardly-extending arcuate supports, a bearing block fitted to said supports from the inside, a clamp fitted to said supports from the outside, bolts passing through said clamp into said block, and another bolt passing through said clamp into said block, and provided with a spring interposed between said clamp and the head of said last-named bolt, of work-holding means carried by said block.

141. The combination, in a bevel-gear generator, with a supporting member provided with outwardly-extending arcuate supports, a bearing block fitted to said supports from the inside, a clamp fitted to said supports from the outside, bolts passing through said clamp into said block, and another bolt passing through said clamp into said block, and provided with a spring interposed between said clamp and the head of said last-named bolt, said clamp and block having interengaging parts through which said last-named bolt passes, of work-holding means carried by said block.

142. The combination, in a bevel-gear generator, with a bearing member, of a sleeve journaled in said member, a nut secured to said sleeve at the outer terminal thereof, work-holding members also secured to said sleeve, a clutch-member mounted on and secured to said sleeve outside of said bearing member, a second clutch-member mounted on said sleeve, said clutch-members having interengaging teeth, and said first clutch-member also having peripheral teeth, a spring arranged to force said second clutch-member toward said first clutch-member, cam-rings on and between said clutch members outside of said interengaging teeth, one of said cam-rings having peripheral teeth, a segmental-gear mounted on said cam-rings and carrying a pawl to engage the cam-ring peripheral teeth, and also carrying a pawl to engage said clutch-member peripheral teeth, a guide band arranged over said first clutch-member, and having a recess therein to permit one of said pawls to snap into engagement with said clutch-member peripheral teeth, a rack intermeshing with said segmental-gear, and means intermittently to actuate said rack.

143. The combination, in a bevel-gear generator, with a bearing member, of a sleeve journaled in said member, a nut secured to said sleeve at the outer terminal thereof, work-holding members also secured to said sleeve, a clutch-member mounted on and secured to said sleeve outside of said bearing member, a second clutch-member mounted on said sleeve, said clutch-members having interengaging teeth, and said first clutch-member also having peripheral teeth, a spring arranged to force said second clutch-member toward said first clutch-member, cam-rings on and between said clutch members outside of said interengaging teeth, one of said cam-rings having peripheral teeth, a segmental-gear mounted on said cam rings and carrying a pawl to engage the cam-ring peripheral teeth, and also carrying a pawl to engage said clutch-member peripheral teeth, an adjustable guide band arranged over said first clutch-member, and having a recess therein to permit one of said pawls to snap into engagement with said clutch-member peripheral teeth, a rack intermeshing with said segmental-gear, and means intermittently to actuate said rack.

144. The combination, in a bevel-gear generator, with a bearing member, of a sleeve journaled in said member, a nut secured to said sleeve at the outer terminal thereof, work-holding members also secured to said sleeve, a clutch-member mounted on and secured to said sleeve outside of said bearing member, a second clutch-member mounted on said sleeve, said clutch-members having interengaging teeth, and said first clutch-member also having peripheral teeth, a spring arranged to force said second clutch-member toward said first clutch-member, cam-rings on and between said clutch-members outside of said interengaging teeth, one of said cam-rings having peripheral teeth, a segmental-gear mounted on said cam-rings and carrying a pawl to engage the cam-ring peripheral teeth, and also carrying a pawl to engage said clutch-member peripheral teeth, a guide band arranged over said first clutch-member and having a recess therein to permit one of said pawls to snap into engagement with said clutch-member peripheral teeth, a rack intermeshing with said segmental-gear, a cylinder supported by said bearing member, a rod attached to said rack and extending into said cylinder, a piston on said rod in said cylinder, and means to introduce fluid under pressure into said cylinder on opposite sides of said piston.

145. The combination, in a bevel-gear generator, with a supporting member provided with a crown-gear segment, and with a rotatable bearing support, and means partially to rotate said support intermittently in opposite directions, of a sleeve journaled in said bearing support, work-holding means secured to said sleeve, a collar, a friction band on said collar, and a clutch-member mounted on said sleeve, means to lock said clutch-member to said sleeve, a spring between said collar and said clutch-member, and a master-gear segment intermeshing with said crown-gear segment, and having a hub mounted on and secured to said clutch-member, said band having a part in engagement with such hub.

146. The combination, in a bevel-gear generator, with a supporting member provided with a crown-gear segment, a rotatable ring carried by said member, and having forwardly-extending arcuate supports provided with a bearing, and means to rotate said ring intermittently in opposite directions, of a sleeve journaled in said bearing, work-holding means secured to said sleeve, a collar, a friction band on said collar, and a clutch-member mounted on said sleeve, means to lock said clutch-member to said sleeve, a spring between said collar and said clutch-member, and a master-gear segment intermeshing with said crown-gear segment, and having a hub mounted on and secured to said clutch member, said band having a part in engagement with said hub.

147. The combination, in a bevel-gear generator, with a supporting member, and a bearing member carried by said supporting member, of a sleeve journaled in said bearing member, a guide having a hub mounted on said bearing member, a rack slidingly arranged in said guide, means to operate said rack, work-holding members secured to said sleeve, and indexing members mounted on said sleeve and consisting in part of a segmental-gear which intermeshes with said rack.

148. The combination, in a bevel-gear generator, with a frame, a gate hinged to said frame, and a bearing member carried by said gate, of a sleeve journaled in said bearing member, a guide having a hub mounted on said bearing member, a rack slidingly arranged in said guide, means to operate said rack, work-holding members secured to said sleeve, and indexing members mounted on said sleeve and consisting in part of a segmental-gear which intermeshes with said rack.

149. The combination, in a bevel-gear generator, with a supporting member provided with a crown-gear segment, a ring rotatably connected with said member, and provided with a segmental-gear, work-holding means supported from said ring, and a master-gear segment operatively connected with said work-holding means and intermeshing with said crown-gear segment, of a rack intermeshing with said segmental-gear, a cylinder, a piston in said cylinder and provided with a rod, connecting means between said rack and said rod, and means to introduce fluid under pressure into said cylinder on opposite sides of said piston.

150. The combination, in a bevel-gear generator, with a frame, a gate hinged to said frame, and provided with a crown-gear segment, a ring rotatably connected with said gate, and provided with a segmental-gear, work-holding means supported from said ring, and a master-gear segment operatively connected with said work-holding means and intermeshing with said crown-gear segment, of a rack intermeshing with said segmental-gear, a cylinder, a piston in said cylinder and provided with a rod, connecting means between said rack and said rod, and means to introduce fluid under pressure into said cylinder on opposite sides of said piston, said rack and cylinder being carried by said gate.

151. The combination, in a bevel-gear generator, with a frame, a gate hinged to said frame and provided with a crown-gear segment, a ring rotatably connected with said gate, and provided with outwardly-projecting arcuate supports, and with a segmental-gear, work-holding means carried by and adjusted on said arcuate supports, and a master-gear segment operatively connected with said work-holding means and intermeshing with said crown-gear segment, of a rack intermeshing with said segmental-gear, a cylinder, a piston in said cylinder and provided with a rod, connecting means between said rack and said rod, and means to introduce fluid under pressure into said cylinder on opposite sides of said piston, said rack and cylinder being carried by said gate.

152. The combination, in a bevel-gear generator, with a supporting member provided with a crown-gear segment, a ring rotatably connected with said member, and provided with outwardly-projecting arcuate supports, and with a segmental-gear, work-holding means, carried by and adjustable on said arcuate supports, and a master-gear segment operatively connected with said work-holding means and intermeshing with said crown-gear segment, of a rack intermeshing with said segmental-gear, a cylinder, a piston in said cylinder and provided with a rod, connecting means between said rack and said rod, and means to introduce fluid under pressure into said cylinder on opposite sides of said piston.

153. The combination, in a bevel-gear generator, with a distributing valve comprising a casing having therein valve and exhaust chambers and being provided with inlet and outlet ports, and a main valve and rod, and auxiliary spring-pressed valves on said rod above and below said main valve, in said valve chamber, of a cylinder, a piston in said cylinder provided with a rod, means to introduce fluid from said valve chamber into said cylinder on opposite sides of said piston, according to the position of said main and auxiliary valves, a rack operated by said last-named rod, a supporting member provided with a crown-gear segment, a rotatable ring carried by said supporting member, and provided with a segmental-gear which intermeshes with said rack, work-holding means carried by said supporting member, and a master-gear segment operatively connected with said work-holding means, and intermeshing with said crown-gear segment.

154. The combination, in a bevel-gear generator, with a distributing valve comprising a casing having therein valve and exhaust chambers and inlet and outlet ports, and a main valve and rod, and auxiliary spring-pressed valves on said rod above and below said main valve, in said valve chamber, said rod having a rack at the outer terminal, of a cylinder, a piston in said cylinder provided with a rod, means to introduce fluid from said valve chamber into said cylinder on opposite sides of said piston, according to the position of said main and auxiliary valves, a rack having an arm, and operated by said last-named rod, a supporting member provided with a crown-gear segment, a rotatable ring carried by said supporting member, and provided with a segmental-gear which intermeshes with said second-named rack, work-holding means carried by said supporting member, a master-gear segment operatively connected with said work-holding means, and intermeshing with said crown-gear segment, a segmental-gear intermeshing with said first-named rack, an operating arm for said second-named segmental-gear, resilient means normally to retain said arm with its segmental-gear in either of its two extreme positions, a rod pivotally connected with said arm, and provided with collars, a slide having an arm which is received between said collars, a rod passing through said last-named arm and through said rack arm, and a collar on said last-named rod above said rack arm, the construction and arrangement of parts being such that, when said second-named rack is carried downwardly, it transmits a downward movement to said rods which intervene between said second-named rack and said second-named segmental-gear, causes the lattter to be actuated, and, through the medium of the same, causes the valve rod to be elevated, and, when said second-named rack is carried upwardly, it transmits a downward movement to said rods, and causes the second-named segmental-gear to be actuated, and said valve rod to be depressed.

155. The combination, in a bevel-gear generator, with a casing having therein valve and exhaust chambers, and being provided with inlet and outlet ports, a stem and a main valve secured thereto in said valve chamber, and spring-pressed auxiliary valves on said stem on opposite sides of said main valve, of work-rolling means consisting in part of a rack, and intervening mechanism between said stem and said rack to cause the former to be actuated by the latter.

156. The combination, in a bevel-gear generator, with a casing having therein valve and exhaust chambers, and being provided with inlet and outlet ports, a stem and a main valve secured thereto in said valve chamber, and spring-pressed auxiliary valves on said stem on opposite sides of said main valve, of work-rolling means consisting in part of a rack, and mechanism, intervening between said stem and rack, to cause said stem to be actuated by said rack in the opposite direction to that in which the rack is moved.

157. The combination, in a bevel-gear generator, with a frame provided with hinge lugs, of a gate provided with hinge lugs, a hollow spindle extending through said lugs, and having a screw-threaded part, a spindle passing through said hollow spindle, and in threaded engagement with said screw-threaded part, means to support said second-named spindle and hold the same against endwise movement, and an operating member for said second-named spindle.

158. The combination, in a bevel-gear generator, with a frame provided with hinge lugs, of a gate also provided with hinge lugs, a hollow spindle extending through said lugs, and having a screw-threaded part, a spindle passing through said hollow spindle and in threaded engagement with said screw-threaded part, means to support said second-named spindle and hold the same against endwise movement, and an operating member for said second-named spindle.

159. The combination, in a bevel-gear generator, with a frame provided with hinge lugs, of a gate also provided with hinge lugs, a hollow spindle extending through said lugs, and having a screw-threaded part, a spindle passing through said hollow spindle and in threaded engagement with said screw-threaded part, means to support said second-named spindle and hold the same against endwise movement, means to lock said spindles together and release them, and an operating member for said second-named spindle.

160. The combination, in a bevel-gear generator, with a frame provided with hinge lugs, of a gate also provided with hinge lugs, a hollow spindle extending through said lugs, and split at the upper end, and having a screw-threaded part, a spindle passing through said hollow spindle and in threaded engagement with said screw-threaded part, means to support said second-named spindle, and hold the same against endwise movement, a split sleeve around the split end of said hollow spindle, means to contract said sleeve and thus contract said split end on said second-named spindle, and an operating member for said second-named spindle.

161. The combination, in a bevel-gear generator, with a frame provided with hinge lugs, of a gate also provided with hinge lugs, and having a screw-threaded part, means rigidly to secure said gate lugs to said hollow spindle, a spindle passing through said hollow spindle and in threaded engagement with said screw-threaded part, means to support said second-named spindle and hold the same against endwise movement, means to lock said spindles together and release them, and an operating member for said second-named spindle.

162. The combination, in a bevel-gear generator, with a supporting part of a frame, such part being provided with hinge lugs, and having an opening through the bottom, and a plate secured to said bottom, of a gate also provided with hinge lugs, a hollow spindle extending through said lugs, and having a screw-threaded part, a spindle extending through said hollow spindle and through said plate, and having a screw-threaded part to engage said first-named screw-threaded part, a bearing between said screw-threaded part of said second-named spindle and said plate, a projecting member secured to said second-named spindle beneath said plate, and an operating member for said second-named spindle.

163. In a bevel-gear generator, a frame, an outwardly swinging gate hinged to said frame, means to adjust said gate vertically, and work-holding means carried by said gate.

164. In a bevel-gear generator, a frame, a gate hinged to said frame, means to adjust said gate vertically, and work-holding means and work-rolling means carried by said gate.

165. In a bevel-gear generator, a frame, a gate hinged to said frame, means to adjust said gate vertically, and work-holding means and work-indexing means carried by said gate.

166. In a bevel-gear generator, a frame, a gate hinged to said frame, means to adjust said gate vertically, and work-holding means, work-indexing means, and work-rolling means, all carried by said gate.

167. In a bevel-gear generator, a frame, a gate hinged to said frame, means to adjust said gate vertically, and work-holding means and work-indexing means carried by said gate, said work-indexing means consisting in part of hydraulic-operating means therefor.

168. In a bevel-gear generator, a frame, a gate hinged to said frame, means to adjust said gate vertically, and work-holding means and work-rolling means carried by said gate, said work-rolling means consisting in part of hydraulic-operating means therefor.

169. In a bevel-gear generator, a frame, a gate hinged to said frame, means to adjust said gate vertically, and work-holding means, work-indexing means, and work-rolling means, all carried by said gate, each of said work-indexing means and work-rolling means consisting in part of hydraulic-operating means therefor.

170. In a bevel-gear generator, a frame, a gate hinged to said frame, means to adjust said gate vertically, work-holding means carried by said gate, and means, also carried by said gate, to adjust said work-holding means to obtain different pitch-angles.

JULIAN L. PERKINS.